(12) United States Patent
Adachi et al.

(10) Patent No.: US 11,585,649 B2
(45) Date of Patent: Feb. 21, 2023

(54) SHIFT DRUM ANGLE DETECTING DEVICE FOR TRANSMISSION

(71) Applicant: HONDA MOTOR CO., LTD., Tokyo (JP)

(72) Inventors: Jun Adachi, Tokyo (JP); Hiroyuki Kojima, Tokyo (JP); Akira Tokito, Tokyo (JP); Yoshikazu Furusawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 376 days.

(21) Appl. No.: 17/031,264

(22) Filed: Sep. 24, 2020

(65) Prior Publication Data

US 2021/0095951 A1 Apr. 1, 2021

(30) Foreign Application Priority Data

Sep. 30, 2019 (JP) .............................. JP2019-180607

(51) Int. Cl.
*G01B 7/30* (2006.01)
*F16H 63/18* (2006.01)

(52) U.S. Cl.
CPC .............. *G01B 7/30* (2013.01); *F16H 63/18* (2013.01)

(58) Field of Classification Search
CPC . G01B 7/30; F16H 63/18; F16H 59/70; F16H 63/16; F16H 61/32; F16H 63/42; G01D 5/165
See application file for complete search history.

(56) References Cited

U.S. PATENT DOCUMENTS

| 7,624,659 | B2 | 12/2009 | Futamura et al. |
| 8,327,729 | B2 | 12/2012 | Matsumoto et al. |
| 9,849,885 | B2 | 12/2017 | Sakamoto et al. |
| 2009/0021246 | A1 | 1/2009 | Uehira et al. |

(Continued)

FOREIGN PATENT DOCUMENTS

JP 6226848 B2 11/2017

OTHER PUBLICATIONS

Office Action dated Jun. 29, 2021 issued in the corresponding Indian Patent Application No. 202014041251.

(Continued)

*Primary Examiner* — Jermele M Hollington
*Assistant Examiner* — Suresh K Rajaputra
(74) *Attorney, Agent, or Firm* — Carrier Shende & Associates, P.C.; Joseph P. Carrier; Fulchand P. Shende

(57) ABSTRACT

A shift drum angle detecting device includes: a first angle sensor configured to output a first sensor output value corresponding to a shaft rotational angle of a first sensor shaft integrally rotating with a shift drum; and a second angle sensor configured to output a second sensor output value corresponding to a shaft rotational angle of a second sensor shaft rotating at an increased speed as a result of a speed increasing mechanism increasing the rotation of the first sensor shaft. A first sensor switching angle where the maximum value and the minimum value of the first sensor output value are switched and a second sensor switching angle where the maximum value and the minimum value of the second sensor output value are switched are set to be different from each other in rotational angle of the shift drum. Such device precisely detects any rotational angle of the shift drum.

11 Claims, 15 Drawing Sheets

(56) References Cited

U.S. PATENT DOCUMENTS

2016/0091089 A1* 3/2016 Nakamura .............. F16H 63/16
74/337.5
2019/0093765 A1 3/2019 Kubota et al.

OTHER PUBLICATIONS

Office Action, dated Oct. 28, 2022, issued in the corresponding German Patent Application No. 10 2020 125 491.1.

* cited by examiner

SHIFT DRUM ANGLE DETECTING DEVICE FOR TRANSMISSION

BACKGROUND

1. Technical Field

The present invention relates to a shift drum angle detecting device that precisely detects the rotational angle of a shift drum for a transmission of a vehicle.

2. Description of the Background

In a conventional dual clutch transmission for a vehicle, a shift drum in a change mechanism of the transmission rotates to move shift forks. The moved shift forks move shifter gears to switch the shift stage (see Patent Literature 1).

For example, when a speed change is made from the first speed to the second speed, the gear position of the shift drum is switched from the first speed position (1-n) through the first speed-second speed preparatory position (1-2) to the second speed position (n-2).

CITATION LIST

Patent Literature

Patent Literature 1: Japanese Patent No. 6226848

The transmission disclosed in Patent Literature 1 has shift stages of seven speeds and the reverse position. Accordingly, fifteen gear positions are provided at the shift drum, namely, the reverse position, the neutral position, the first, second, . . . , the seventh speed position and preparatory positions (RVS, n-n, 1-n, 1-2, n-2, 3-2, 3-n, 3-4, n-4, 5-4, 5-n, 5-6, n-6, 7-6, 7-n).

The fifteen gear positions are provided at a regular interval for one rotation of the shift drum. The interval of the gear positions is 24 degrees.

A gear position sensor, which is an angle sensor implemented by a potentiometer provided at the shift drum, must precisely detect the interval of 24 degrees.

The transmission disclosed in Patent Literature 1 includes a first angle sensor configured to detect a normal-speed rotation of the shift drum and a second angle sensor configured to detect an increased-speed rotation of the shift drum as a result of a speed increasing mechanism increasing the rotation of the shift drum. Through use of the output value of the first angle sensor and that of the second angle sensor, the rotational angle of the shift drum is precisely detected.

The shift drum angle is defined so that the shift-down end of the reverse position, which is the lowermost-position shift stage on the shift-down end, is 0 degrees and the shift-up end of the seventh speed position, which is the uppermost-position shift stage on the shift-up end, is 360 degrees. When the shift drum angle is 0 degrees, the output voltage of the first angle sensor and that of the second angle sensor are both 0. According to a rotation of the shift drum from 0 degrees, the voltage rises. When the shift drum has rotated by 360 degrees, the first angle sensor outputs the maximum voltage. Every 24 degree-rotation of the shift drum, the second angle sensor outputs the maximum voltage and simultaneously switches to output the voltage of zero.

BRIEF SUMMARY

Here, when the gear positions are further increased in number, setting the lead grooves of all the gear positions within the 360 degrees without increasing the outer diameter of the shift drum causes abrupt axial changes in the lead grooves. That is, the shift forks cannot be smoothly moved.

Addressing thereto, in increasing the gear positions in number, the lead grooves may be formed past 360 degrees, and different gear positions may be set on both ends of the lead grooves while being axially displaced from each other.

In this case, as described above, when it is intended to detect the rotational angle of the shift drum using the output value of the first angle sensor and that of the second angle sensor, the first angle sensor detects a rotation of more than 360 degrees. At 360 degrees, the output of the first angle sensor attains the maximum voltage and simultaneously switches to the minimum voltage.

At any shift drum angle, when both the first angle sensor and the second angle sensor output the voltage of 0, that is, when the voltage switching takes place simultaneously, the output voltage is unstable with both the first angle sensor and the second angle sensor. Thus, the rotational angle of the shift drum cannot be precisely detected, which influences actuator control.

The present invention has been made in view of the foregoing, and an object thereof is to provide a shift drum angle detecting device for a transmission that detects any rotational angle of a shift drum with high precision while avoiding any influence on actuator control.

In order to attain the object, the present invention provides a shift drum angle detecting device for a constant-mesh transmission including a main shaft holding a plurality of driving gears and a counter shaft holding a plurality of driven gears meshing with the plurality of driving gears. The shift drum angle detecting device includes: shift forks configured to engage with shifter gears of the driving gears and the driven gears; a shift drum including an outer circumferential surface provided with lead grooves where one ends of the shift forks engage; a first sensor shaft provided at the shift drum so as to integrally rotate with the shift drum; a second sensor shaft configured to rotate at an increased speed as a result of a speed increasing mechanism increasing a rotation of the first sensor shaft by a predetermined speed increasing ratio; a first angle sensor configured to output a first sensor output value corresponding to a shaft rotational angle of the first sensor shaft; and a second angle sensor configured to output a second sensor output value corresponding to a shaft rotational angle corresponding to the second sensor shaft. The first sensor output value once switches between a maximum value and a minimum value at a first sensor switching angle per rotation of the shift drum. The second sensor output value switches between a maximum value and a minimum value at a second sensor switching angle for a number of times corresponding to the speed increasing ratio of the speed increasing mechanism per rotation of the shift drum. A rotational angle of the shift drum is detected using the first sensor output value and the second sensor output value input at predetermined timing. The first sensor switching angle and the second sensor switching angle are set to be different from each other in rotational angle of the shift drum.

In this configuration, since the first sensor switching angle and the second sensor switching angle are set to be different from each other in rotational angle of the shift drum, at any shift drum angle, the first angle sensor and the second angle sensor are prevented from simultaneously detecting their respective sensor switching angles. Thus, the rotational angle of the shift drum can be detected always according to the output value of at least one of the first angle sensor and the second angle sensor. This minimizes any influence on actuator control.

In particular, the present embodiment is effective in the case where: the lead grooves are formed past 360 degrees at the outer circumference of the shift drum; different gear positions are set on both ends of the lead grooves while being axially displaced from each other; and the shift drum rotates past 360 degrees.

In a suitable embodiment of the present invention, when it is determined that the first angle sensor is detecting the first sensor switching angle, the rotational angle of the shift drum is detected according to a previous value of the detected rotational angle of the shift drum and a change amount of a second sensor angle obtained by converting the detected shaft rotational angle of the second angle sensor to a rotational angle of the shift drum. When it is determined that the second angle sensor is detecting the second sensor switching angle, the rotational angle of the shift drum is detected according to the previous value of the detected rotational angle of the shift drum and a change amount of a first sensor angle obtained by converting the detected shaft rotational angle of the first angle sensor to a rotational angle of the shift drum.

In this configuration, when it is determined that one of the first angle sensor and the second angle sensor is detecting one of the first sensor switching angle and the second sensor switching angle, the output value of the angle sensor detecting the sensor switching angle may be unstable. Therefore, the rotational angle of the shift drum is detected precisely according to the change amount of the sensor angle obtained by converting the shaft rotational angle detected by the other angle sensor to the rotational angle of the shift drum and the previous value of the detected rotational angle of the shift drum.

In a suitable embodiment of the present invention, the first sensor switching angle and the second sensor switching angle are both set within a rotational angle region including just a neutral position of the shift drum.

In this configuration, by virtue of setting both the first sensor switching angle and the second sensor switching angle to fall within the rotational angle region including just the neutral position where delicate control such as in a gear-in mode is not necessary, at gear positions other than the neutral position, the rotational angle of the shift drum is precisely detected avoiding any influence of the first sensor switching angle and the second sensor switching angle. This realizes delicate control such as in a gear-in mode.

In a suitable embodiment of the present invention, the shift drum is provided with a star-shaped cam configured to integrally rotate with the shift drum. The star-shaped cam includes an outer circumferential surface where curved recessed parts respectively corresponding to the shift stages and sharpened projecting parts are alternately and continuously arranged in a circumferential direction. The shift drum angle detecting device further includes a detent mechanism including a roller and a biasing means. The roller biased by the biasing means is pressed against the outer circumferential surface of the star-shaped cam and fits into the recessed part corresponding to a prescribed one of the shift stages of the star-shaped cam, to regulate the rotation of the shift drum and establish the prescribed shift stage. The first sensor switching angle is set between a rotational angle of a bottom position at a center of the recessed part at the neutral position of the star-shaped cam and a rotational angle of a vertex of one of the projecting parts positioned on both sides of the recessed part continuously. The first sensor switching angle is set toward the one projecting part.

Around the center of the curved recessed part of the star-shaped cam, the shift stage is established. Accordingly, the rotational angle of the shift drum here must be detected with high precision.

In this configuration, the first sensor switching angle where the output value of the first angle sensor is unstable is set between the rotational angle of the bottom position at the center of the recessed part of the star-shaped cam and the rotational angle of the vertex of the projecting part continuous to the recessed part and toward the projecting part. This realizes highly precise detection of the rotational angle of the shift drum around the center of the recessed part of the star-shaped cam where the shift stage is established.

In a suitable embodiment of the present invention, the roller is rotatably held on an end of a detent arm configured to swing as being biased by the biasing means. In a state where the roller fits into the recessed part at the neutral position of the star-shaped cam, the first sensor switching angle is set to a rotational angle toward, out of the projecting parts positioned on both sides of the recessed part continuously, the projecting part on a farther side from a swing center of the detent arm.

There are non-stable-rotation angle regions at the vertex of the projecting part and on both sides of the vertex where the component force in the direction of rotating the star-shaped cam of the pressing force of the roller at the contact point of the projecting part of the star-shaped cam on which the roller abuts is small and not effective in rotating the star-shaped cam.

Since the non-stable-rotation angle regions are angle regions where the rotation of the shift drum may stop. If the first sensor switching angle is at the non-stable-rotation angle region, the detected rotational angle becomes increasingly unreliable. Therefore, the first sensor switching angle must be set avoiding the non-stable-rotation angle regions.

In the state where the roller fits into the recessed part of the neutral position of the star-shaped cam, the non-stable-rotation angle region is at each of the projecting parts on both sides and continuous to the recessed part. The non-stable-rotation angle region of the projecting part farther from the swing center of the detent arm (88*b*) is narrower than the non-stable-rotation angle region of the projecting part nearer to the swing center of the detent arm (88*b*).

In this configuration, in the state where the roller fits into the recessed part of the neutral position of the star-shaped cam, the first sensor switching angle is set to the rotational angle toward, out of the projecting parts on both sides and continuous to the recessed part, the projecting part having the narrower non-stable-rotation angle region on the side farther from the swing center of the detent arm. Thus, the first sensor switching angle is set to the farthest possible position from the center of the recessed part. This realizes highly precise detection of the rotational angle of the shift drum over a wider range around the center of the recessed part of the star-shaped cam where the shift stage is established, while minimizing the influence of the first sensor switching angle.

In a suitable embodiment of the present invention, in the shift drum, in the lead grooves formed at the outer circumferential surface, a lowermost-position shift stage on a shift-down end and an uppermost-position shift stage on a shift-up end are at an identical rotational angle position while axially displaced from each other. At start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

In the case where, in the lead grooves formed at the outer circumferential surface of the shift drum, the lowermost-position shift stage on the shift-down end and the uppermost-position shift stage on the shift-up end are at an identical rotational angle position while axially displaced from each other, by any factor, whether the shift stage is the lowermost-position shift stage or the uppermost-position shift stage may not be determined. In such a case, in the present configuration, whether the shift stage is the lowermost-position shift stage or the uppermost-position shift stage can be determined by rotating the shift drum in one direction and determining whether or not the switching of the shift stage is executed. Thus, the rotational angle of the shift drum detected after the execution of the switching the shift stage is adaptable.

In the present invention, since the first sensor switching angle and the second sensor switching angle are set to be different from each other in rotational angle of the shift drum, the first angle sensor and the second angle sensor are prevented from simultaneously detecting their respective sensor switching angles at any shift drum angle. Thus, the rotational angle of the shift drum is detected always according to the output value of at least one of the first angle sensor and the second angle sensor, with a minimum influence on actuator control.

In particular, the present embodiment is effective in the case where: the lead grooves are formed past 360 degrees at the outer circumference of the shift drum; different gear positions are set on both ends of the lead grooves while being axially displaced from each other; and the shift drum rotates past 360 degrees.

DETAILED DESCRIPTION

In the following, with reference to FIGS. 1 to 15, a description will be given of an embodiment of the present invention.

Figure 1:
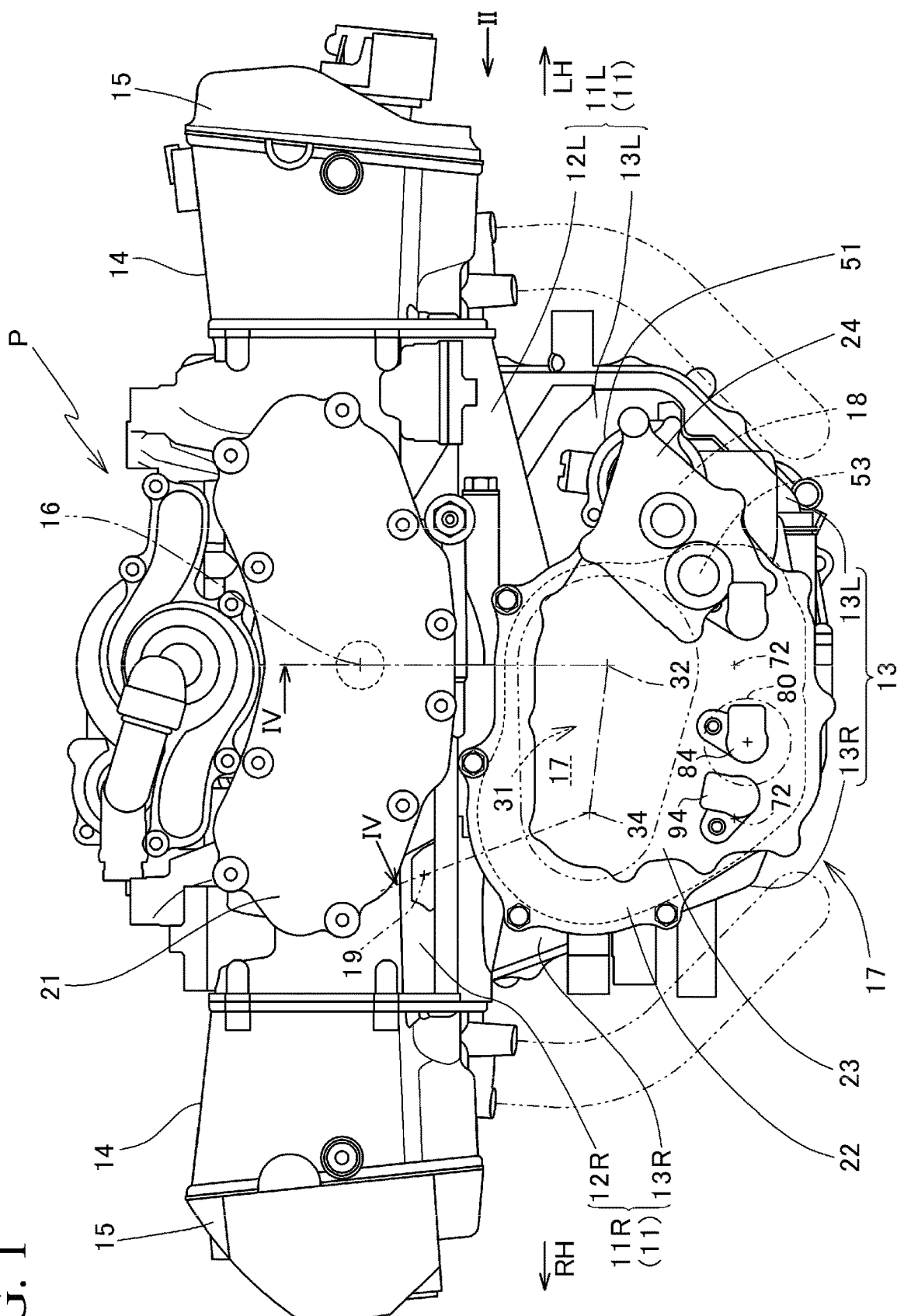
FIG. 1 is a partially omitted front view of a power unit equipped with a shift drum angle detecting device for a transmission according to an embodiment of the present invention.

FIG. 1 is a partially omitted front view of a power unit P equipped with a shift drum angle detecting device for a transmission according to an embodiment of the present invention.

Figure 2:
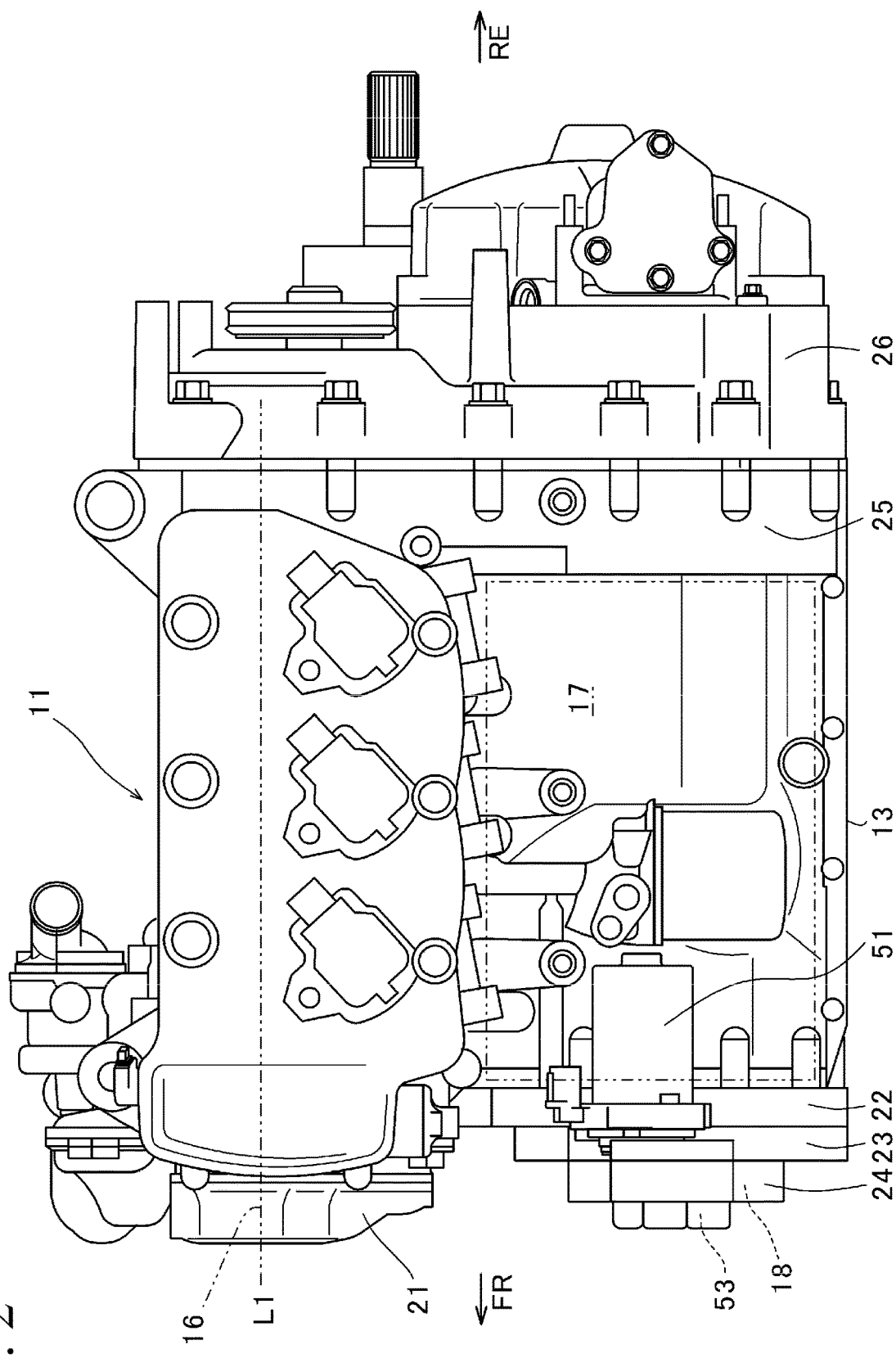
FIG. 2 is a left side view of a power unit taken along line II in FIG. 1.

FIG. 2 is a left side view of a power unit P taken along line II in FIG. 1.

The power unit P includes: a flat-six water-cooled four-stroke engine E mounted on the motorcycle in a so-called longitudinal orientation having its crankshaft oriented in the vehicle front-rear direction; and a dual clutch transmission 31 coupled to the engine E so as to convert the power of the engine E to a predetermined shift stage.

In the description, the terms front, rear, right, and left are based on the ordinary standard in which the forward traveling direction of the motorcycle equipped with the power unit P is the front side. In the drawings, FR indicates the front side, RR indicates the rear side, LH indicates the left side, and RH indicates the right side.

As illustrated in FIG. 1, the engine E includes: an engine block 11 consisting of a left engine block half 11L disposed on the left side facing the forward traveling direction of the motorcycle and a right engine block half 11R disposed on the right side facing the forward traveling direction; cylinder heads 14 respectively coupled to the left and right ends of the left and right engine block halves 11L, 11R; and head covers 15 respectively overlaid on the cylinder heads 14.

The left engine block half 11L includes a left cylinder block 12L and a left crankcase half 13L integrated with the left cylinder block 12L. The right engine block half 11R includes a right cylinder block 12R and a right crankcase half 13R integrated with the right cylinder block 12R. The left crankcase half 13L and the right crankcase half 13R form the crankcase 13.

Referring also to FIG. 2, a crankshaft 16 has its rotation axis L1 oriented in the vehicle front-rear direction and rotatably held between the left crankcase half 13L and the right crankcase half 13R positioned above the engine block 11.

Pistons (not shown) in the engine block 11 are coupled to the crankshaft 16 via connecting rods (not shown), so that the crankshaft 16 is rotated according to the sliding motion of the pistons brought about by combustion in combustion chambers (not shown).

As illustrated in FIGS. 1 and 2, on the front surface of the upper part of the engine block 11, a front cover 21 is mounted so as to cover the front surface of the upper part of the engine block 11 about the crankshaft 16.

Beneath the engine block 11, a transmission chamber 17 for housing a transmission 31, which will be described later, is defined by left and right crankcase halves 13L, 13R.

Note that, the transmission chamber 17 is represented by a phantom line.

As illustrated in FIG. 2, a rear cover 25 is mounted on the rear side of the engine block 11.

On the rear side in the lower central part of the rear cover 25, a clutch cover 26 is mounted.

As illustrated in FIGS. 1 and 2, on the front surface of the lower part of the crankcase 13, a transmission holder 22 is mounted so as to cover the front side of the transmission chamber 17.

On the front surface of the transmission holder 22 from the center to the lower part of the transmission holder 22, a change system holder 23 for retaining a change mechanism 60 configured to set the shift stage of the transmission 31 is mounted.

On the front surface of the left end of the change system holder 23, a reduction gear cover 24 is mounted. In a reduction gear chamber 18 enclosed by the change system holder 23 and the reduction gear cover 24, a reduction gear mechanism 53, which will be described later, is disposed.

On the rear surface of the left end of the change system holder 23, a shift motor 51 which is a power source for a shift driving device 30 is provided.

Figure 3:
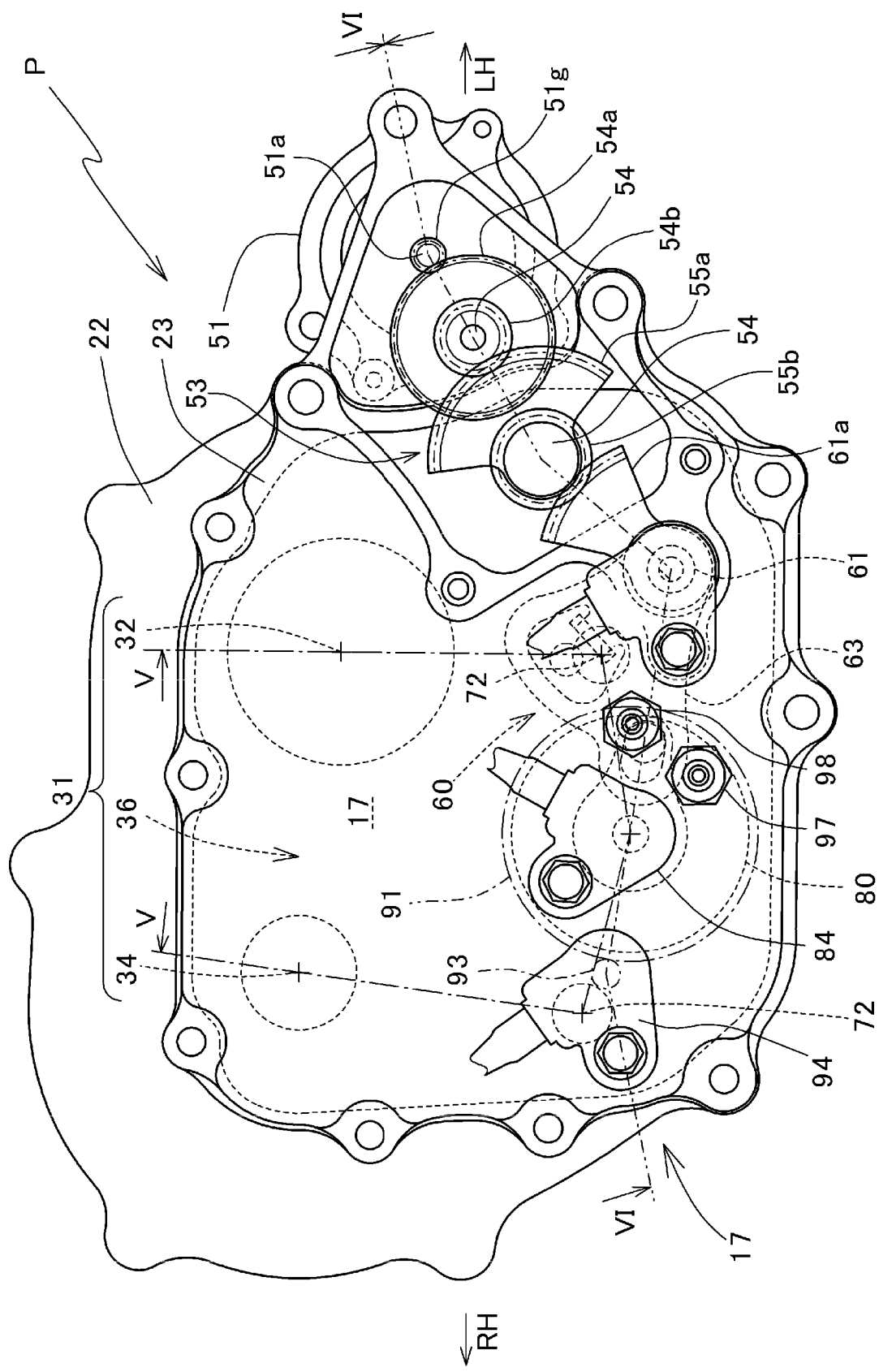
FIG. 3 is a partial enlarged front view of a crankcase at the lower part of the power unit in FIG. 1 without a reduction gear cover.

FIG. 3 is a partial enlarged front view of the crankcase 13 at the lower part of the power unit P in FIG. 1 without the reduction gear cover 24.

As illustrated in FIG. 3, on the rear surface of the transmission holder 22, a main shaft 32, a counter shaft 34, a gear speed change mechanism 36, a shift drum 80, and shift fork shafts 72 are preliminarily assembled and integrated as a cassette unit.

The cassette unit is inserted into the transmission chamber 17 formed of the left and right crankcase halves 13L, 13R. The transmission holder 22 is mounted on the front surface of the crankcase 13 so as to close the front side of the transmission chamber 17.

The main shaft 32, the counter shaft 34, the shift drum 80, and the shift fork shafts 72 inserted into the transmission chamber 17 are arranged in parallel with the rotation axis L1 of the crankshaft 16.

As illustrated in FIG. 2, the main shaft 32 is disposed beneath the crankshaft 16, and the counter shaft 34 is disposed on the right side of the main shaft 32. The shift drum 80 is disposed at the center in the lower part of the transmission chamber 17. In the right-left direction of the shift drum 80 beneath the main shaft 32 and the counter shaft 34, two shift fork shafts 72 are disposed.

Figure 4:
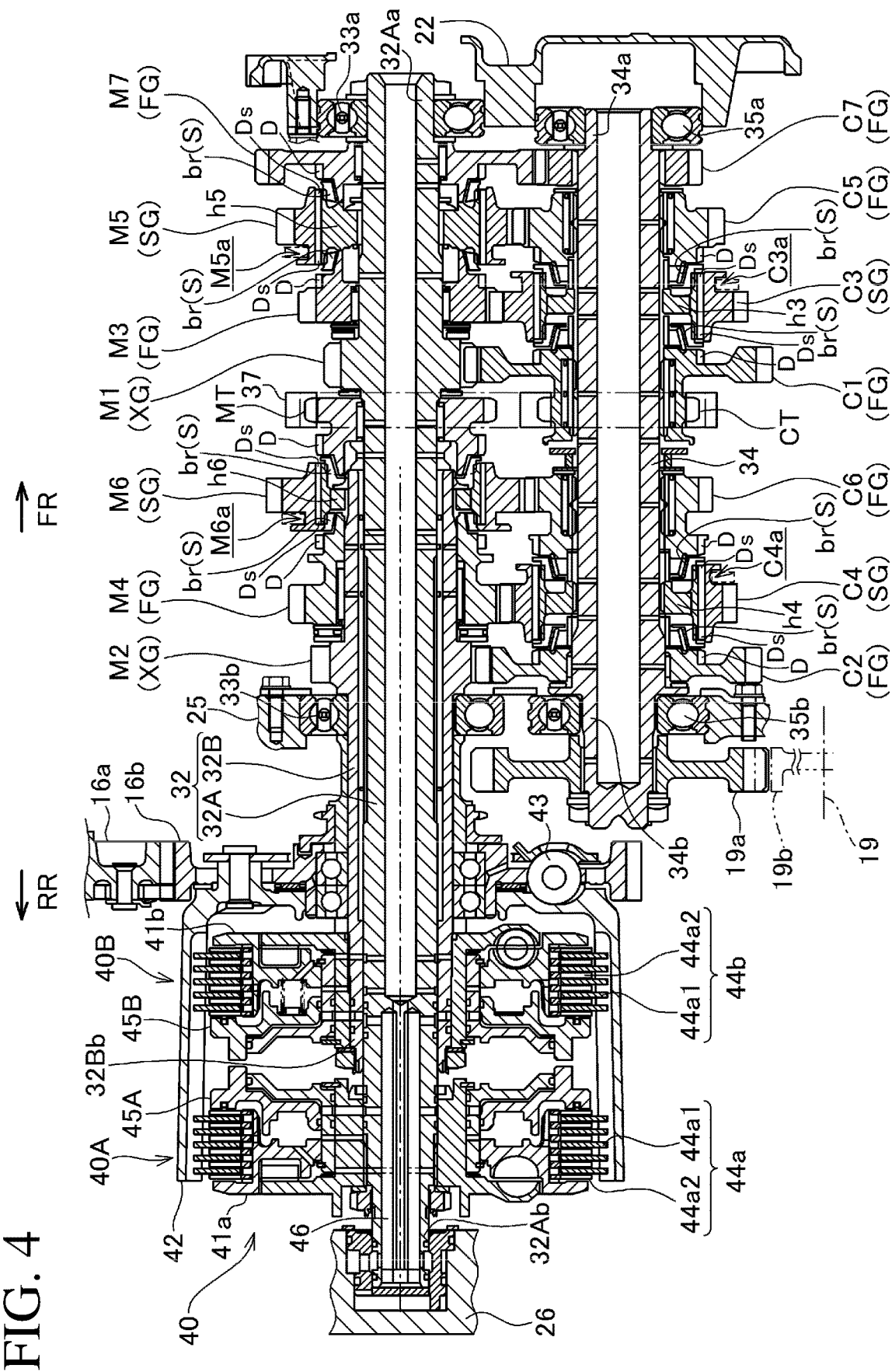
FIG. 4 is a cross-sectional view of a transmission taken along line IV-IV in FIG. 1.

FIG. 4 is a cross-sectional view of the transmission taken along lines IV-IV in FIG. 1.

As illustrated in FIG. 4, the transmission 31 includes the main shaft 32 as the input shaft, the counter shaft 34 as the output shaft, and a hydraulic clutch 40 that connects and disconnects, by hydraulic pressure, transmission of rotational driving force from the gear speed change mechanism 36 and the crankshaft 16.

The main shaft 32 of the transmission 31 is formed of a first main shaft 32A and a cylindrical second main shaft 32B.

The first main shaft 32A has its axial relative position to the second main shaft 32B fixed and penetrates through the second main shaft 32B. Between the first main shaft 32A and the second main shaft 32B, a plurality of needle bearings (not shown) are interposed.

The first main shaft 32A has its front end 32Aa rotatably held on the transmission holder 22 via ball bearings 33a, and has its rear end 32Ab rotatably held on the clutch cover 26.

The second main shaft 32B has its intermediate part penetrated through the rear cover 25 and rotatably held on the rear cover 25 via ball bearings 33b.

The counter shaft 34 has its front end 34a rotatably held on the transmission holder 22 via ball bearings 35a, and has its rear end 34b penetrated through the ball bearings 35b disposed at the rear cover 25 and rotatably held on the rear cover 25 via ball bearings 35b.

In the vicinity of the rear end 34b of the counter shaft 34, a secondary driving gear 19a meshing with a secondary driven gear 19b is spline-fitted.

Between the transmission holder 22 and the rear cover 25 in the main shaft 32, seven driving gears M corresponding to the first speed to the seventh speed and a driven sprocket MT for reverse are held.

Between the transmission holder 22 and the rear cover 25 in the counter shaft 34, seven driven gears C corresponding to and constantly meshing with the driving gears M and a driving sprocket CT for reverse are held.

The driving gears M, the driven gears C, the driving sprocket CT, and the driven sprocket MT form the gear speed change mechanism 36.

Out of the driving gears M, the driving gears M1, M3, M5, M7 in odd-numbered stages and the driven sprocket MT are held on the front end 32Aa side of the first main shaft 32A that penetrates through the second main shaft 32B, in order of the seventh-speed driving gear M7, the fifth-speed driving gear M5, the third-speed driving gear M3, the first-speed driving gear M1, and the driven sprocket MT from the front side.

The first-speed driving gear M1 is a fixed gear XG that is integrated with and rotates integrally with the first main shaft 32A.

The third-speed driving gear M3 and the seventh-speed driving gear M7 are free gears FG that are fixed so as to be rotatable relative to the first main shaft 32A and axially non-shiftable.

The driven sprocket MT is fixed so as to be rotatable relative to the first main shaft 32A and axially non-shiftable.

The fifth-speed driving gear M5 is a sleeve-like shifter gear SG that is spline-fitted to the outer circumference of a hub h5 integrally fitted to the first main shaft 32A. The fifth-speed driving gear M5 integrally rotates with the first main shaft 32A via the hub h5 and is axially shiftable.

At each space between the fifth-speed driving gear M5 and the third-speed driving gear M3 and between the fifth-speed driving gear M5 and the seventh-speed driving gear M7, a synchronous mechanism S including a blocking ring br and others is formed.

Out of the driving gears M, the driving gears M2, M4, M6 in even-numbered stages are held on the front half of the second main shaft 32B positioned on the front side of the rear cover 25 in order of the sixth-speed driving gear M6, the fourth-speed driving gear M4, and the second-speed driving gear M2 from the front side.

The second-speed driving gear M2 is a fixed gear XG integrated with and integrally rotates with the second main shaft 32B.

The fourth-speed driving gear M4 is a free gear FG that is fixed so as to be rotatable relative to the second main shaft 32B and axially non-shiftable.

The sixth-speed driving gear M6 is a sleeve-like shifter gear SG that is spline-fitted to the outer circumference of a hub h6 integrally fitted to the second main shaft 32B. The sixth-speed driving gear M6 integrally rotates with the second main shaft 32B via the hub h6 and is axially shiftable.

At each space between the sixth-speed driving gear M6 and the fourth-speed driving gear M4 and between the sixth-speed driving gear M6 and the driven sprocket MT, a synchronous mechanism S including a blocking ring br and others is formed.

The driven gears C and the driving sprocket CT are held on the counter shaft 34 in order of the seventh-speed driven gear C7, the fifth-speed driven gear C5, the third-speed driven gear C3, the first-speed driven gear C1, the driving sprocket CT, the sixth-speed driven gear C6, the fourth-speed driven gear C4, and the second-speed driven gear C2 from the front side.

The seventh-speed driven gear C7 is a fixed gear XG that is fixed so as to be non-rotatable relative to the counter shaft 34 and axially non-shiftable.

The first-speed driven gear C1, the second-speed driven gear C2, the fifth-speed driven gear C5, and the sixth-speed driven gear C6 are free gears FG that are fixed so as to be rotatable relative to the counter shaft 34 and axially non-shiftable.

The third-speed driven gear C3 is a sleeve-like shifter gear SG that is spline-fitted to the outer circumference of a hub h3 integrally fitted to the counter shaft 34. The third-speed driven gear C3 integrally rotates with the counter shaft 34 via the hub h3 and is axially shiftable.

At each space between the third-speed driven gear C3 and the first-speed driven gear C1 and between the third-speed driven gear C3 and the fifth-speed driven gear C5, a synchronous mechanism S including a blocking ring br and others is formed.

The fourth-speed driven gear C4 is a sleeve-like shifter gear SG that is spline-fitted to the outer circumference of a hub h4 integrally fitted to the counter shaft 34. The fourth-speed driven gear C4 integrally rotates with the counter shaft 34 via the hub h4 and is axially shiftable.

At each space between the fourth-speed driven gear C4 and the second-speed driven gear C2 and between the fourth-speed driven gear C4 and the sixth-speed driven gear C6, a synchronous mechanism S including a blocking ring br and others is formed.

The driving sprocket CT is integrated with the first-speed driven gear C1 and disposed so as to oppose to the driven sprocket MT. Across the driving sprocket CT and the driven sprocket MT, a chain 37 for reverse is suspended.

The shifter gears M5, M6, C3, C4 are provided with engaging grooves M5a, M6a, C3a, C4a where hook parts of 71c of the shift forks 71, which will be described later, engage. The shifter gears M5, M6, C3, C4 axially shift according to the operation of the shift forks 71.

When sleeve tooth Ds of the shifter gears M5, M6, C3, C4 engage (in-gear) with dog tooth D of the free gears M4, M5, M7, C1, C2, C3, C6 or the driven sprocket MT via a synchronizing operation of the synchronous mechanisms S, the rotational driving force of the main shaft 32 is transmitted to the counter shaft 34.

As illustrated in FIG. 4, at the rear half of the main shaft 32 projecting rearward than the rear cover 25, the hydraulic clutch 40 is provided.

The hydraulic clutch 40 is formed in a so-called dual clutch (twin clutch) scheme, including: a first hydraulic clutch 40A coupled to the first main shaft 32A; a second hydraulic clutch 40B coupled to the second main shaft 32B; and a clutch outer 42.

A first clutch inner 41a of the first hydraulic clutch 40A is spline-fitted, while being restricted from axially shifting, in the vicinity of the rear end 32Ab of the first main shaft 32A projecting rearward from the rear end 32Bb of the second main shaft 32B.

A second clutch inner 41b of the second hydraulic clutch 40B is spline-fitted, while being restricted from axially shifting, in the vicinity of the rear end 32Bb of the second main shaft 32B.

The clutch outer 42 is held on, via a buffer member 43, a primary driven gear 16b that is rotatably held on the second main shaft 32B between the second hydraulic clutch 40B and the rear cover 25.

The primary driven gear 16b meshes with a primary driving gear 16a fitted to the crankshaft 16, to reduce in speed the rotational driving force supplied from the crankshaft 16 by a predetermined reduction ratio and transmit the speed-reduced force to the hydraulic clutch 40.

Between the clutch outer 42 and the first clutch inner 41a, a first friction plate group 44a formed of alternately arranged driving friction plates 44a1 rotating with the clutch outer 42 and driven friction plates 44a2 rotating with the first clutch inner 41a is provided, so as to be pressurized by a first pressurizing plate 45A.

Between the clutch outer 42 and the second clutch inner 41b, a second friction plate group 44b formed of alternately arranged driving friction plates 44b1 rotating with the clutch outer 42 and driven friction plates 44b2 rotating with the second clutch inner 41b is provided, so as to be pressurized by a second pressurizing plate 45B.

A hydraulic circuit 46 capable of selectively driving the first pressurizing plate 45A and the second pressurizing plate 45B is provided to the second main shaft 32B and the clutch cover 26. Thus, the rotational driving force from the crankshaft 16 is connected or disconnected by hydraulic pressure, whereby the first hydraulic clutch 40A and the second hydraulic clutch 40B are switched, to selectively transmit the power from the crankshaft 16 to the first main shaft 32A or the second main shaft 32B of the main shaft 32.

The power transmitted from the crankshaft 16 to the main shaft 32 is transmitted to the secondary driving gear 19a in a shift stage selectively established by the gear speed change mechanism 36, and output to a rear wheel 7 via the secondary driven gear 19b and a drive shaft 19.

Figure 6:
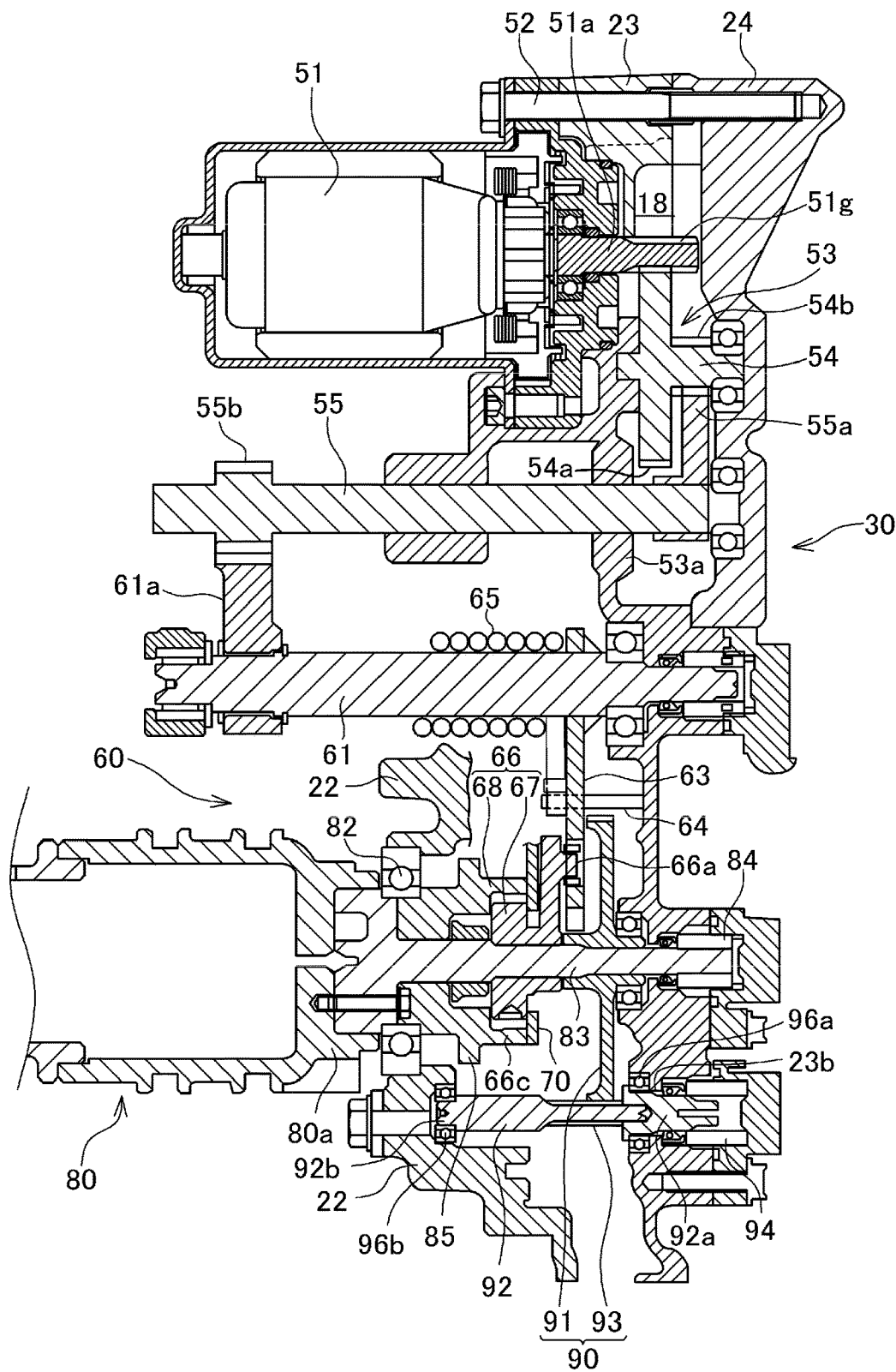
FIG. 6 is a cross-sectional view of a shift driving device taken along line VI-VI in FIG. 3.

FIG. 6 is a cross-sectional view of the shift driving device 30 taken along line VI-VI in FIG. 3.

As illustrated in FIG. 6, in the shift driving device 30, the power necessary for speed change is transmitted, while being reduced in speed by the reduction gear mechanism 53, from the shift motor 51 to the change mechanism 60. Then, the change mechanism 60 changes the shift stage of the transmission 31.

As illustrated in FIGS. 2, 3, and 6, the shift motor 51 is oriented in the front-rear direction so as to be parallel to the crankshaft 16. In the front view, substantially the entire surface of the shift motor 51 is covered with the reduction gear cover 24. In the side view, the shift motor 51 is partially disposed on the left side of the transmission chamber 17. The shift motor 51 is fixed to the change system holder 23 by a bolt 52.

As illustrated in FIG. 6, in front of the shift motor 51, a reduction gear chamber 18 is defined by the change system holder 23 and the reduction gear cover 24. The power of the shift motor 51 is reduced in speed by the reduction gear mechanism 53 disposed in the reduction gear chamber 18 to rotate the shift spindle 61.

In the reduction gear mechanism 53, between the motor shaft 51a of the shift motor 51 and the shift spindle 61, a first intermediate shaft 54 and an elongated second intermediate shaft 55 are arranged in the front-rear direction. A small-diameter driving gear 51g formed at the driving gear motor shaft 51a and a large-diameter gear 54a of the first intermediate shaft 54 mesh with each other. A small-diameter gear 54b of the first intermediate shaft 54 and a large-diameter gear 55a of the second intermediate shaft 55 mesh with each other. A small-diameter gear 55b formed in the vicinity of the rear end of the second intermediate shaft 55 extending rearward and a large-diameter gear 61*a* fitted to the shift spindle 61 mesh with each other.

Figure 7:
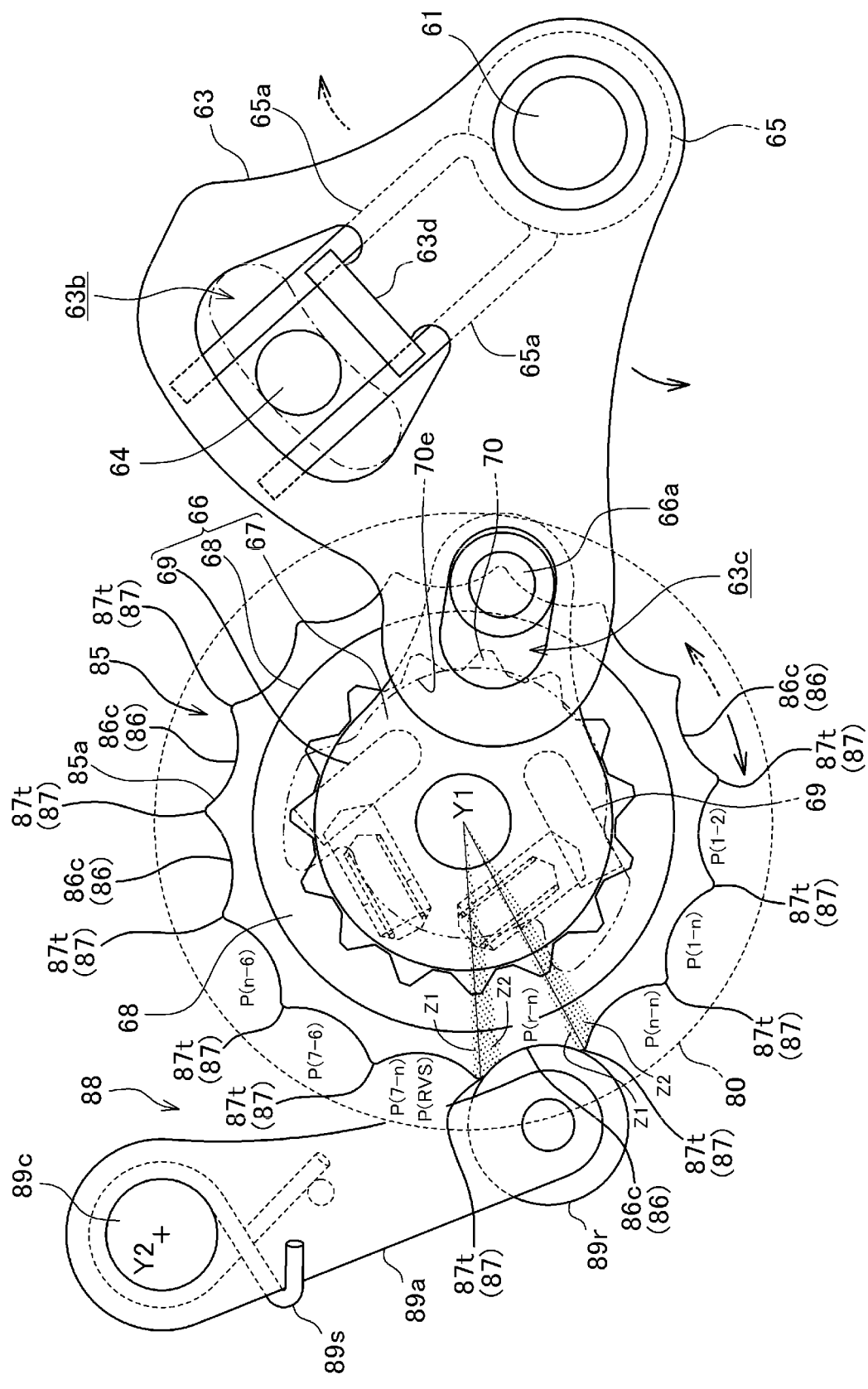
FIG. 7 is a front view of the main part of a change mechanism in a partially simplified manner.

The change mechanism 60 is positioned in front of the transmission chamber 17, and includes the shift spindle 61, a master arm 63, a stopper pin 64 that regulates the rotation amount of the master arm 63, and a pawl ratchet mechanism 66 (see FIG. 7).

The shift spindle 61 is positioned on the front left side of the shift drum 80, and has its rotation axis oriented in the front-rear direction so as to be parallel to the shift drum 80. To the rear end of the shift spindle 61, the large-diameter gear 61*a* of the reduction gear mechanism 53 is serration-fitted. To the front end of the shift spindle 61, the master arm 63 has its basal end fitted. The master arm 63 swings by the rotation of the shift spindle 61.

FIG. 7 is an enlarged view of the main part of the change mechanism 60 in a partially simplified manner.

As illustrated in FIG. 7, the master arm 63 has a substantially triangular plate shape. A stopper pin 64 is formed at the transmission holder 22. The stopper pin 64 penetrates through a driving hole 63*b* formed at the master arm 63. A torsion coil spring 65 is held having its coil part wrapped around the shift spindle 61. Both ends 65*a*, 65*a* of the torsion coil spring 65 extending in the same direction outwardly clamp a catching piece 63*d* formed at the master arm 63 and the stopper pin 64.

Accordingly, when the master arm 63 swings, the torsion spring force of the torsion coil spring 65 exerts the biasing force of returning the master arm 63 to the neutral position.

The swinging movement of the master arm 63 rotates the shift drum 80 via the pawl ratchet mechanism 66.

As illustrated in FIGS. 6 and 7, the pawl ratchet mechanism 66 includes: a ratchet input member 67 provided with a projection 66*a* slidably fitted to a long hole 63*c* formed at the swinging end of the master arm 63; a ratchet output member 68 integrally rotating with the shift drum 80; and a pair of poles 69 set between the outer circumference of the cylindrical part of the ratchet input member 67 and the inner circumference of the ratchet output member 68.

At the end of a first sensor shaft 83 which is a shaft extended frontward on the rotational central axis from the front end of the shift drum 80, a first angle sensor 84 that detects the rotational angle of the shift drum 80 is provided.

The ratchet input member 67 is rotatably held on the first sensor shaft 83. The ratchet output member 68 integrally rotates with the first sensor shaft 83 and the shift drum 80.

When the master arm 63 swings thereby causing the projection 66*a* to slide in the long hole 63*c*, the sliding projection 66*a* guides the ratchet input member 67 to rotate in one direction. Then, the tip of one pole 69 rises and is caught by a catching projection at the inner circumference of the ratchet output member 68. According to the rotation of the ratchet input member 67, the ratchet output member 68 is intermittently rotated. Thus, the shift drum 80 integrated with the ratchet output member 68 is intermittently rotated, to set the shift stage.

Note that, a guide plate 70 (represented by a phantom line in FIG. 7) including a guide inner edge part 70*e* is provided along the cylindrical opening edge that covers the outer circumference of the ratchet input member 67 of the ratchet output member 68. The guide inner edge part 70*e* restricts rising of other pole 69 so as to avoid the other pole 69 from engaging with the catching projection at the inner circumference of the ratchet output member 68 when the ratchet input member 67 returns to the other direction.

For the intermittent rotation of the shift drum 80, a detent mechanism 88 that guides and positions the shift drum 80 to a predetermined rotational position is provided.

At the outer circumferential part of the ratchet output member 68 integrally rotating with the shift drum 80, a star-shaped cam 85 of the detent mechanism 88 is formed.

As illustrated in FIG. 7, at an outer circumferential surface 85*a* of the star-shaped cam 85, curved recessed parts 86 corresponding to shift stages and sharpened projecting parts 87 are alternately arranged in the circumferential direction.

A bottom position 86*c* of each recessed part 86 nearest to a rotational center Y1 of the shift drum 80 is positioned at the center of the recessed part 86. The shape of the recessed part 86 has symmetry with reference to the line connecting between the bottom position 86*c* and the rotational center Y1 of the shift drum 80.

The recessed parts 86 correspond to the gear positions GP. In the present embodiment, fifteen recessed parts 86 are formed at a regular interval of 24 degrees about the rotational center Y1 of the shift drum 80 at the outer circumferential surface 85*a* of the star-shaped cam 85.

In one sharpened projecting part 87 between adjacent recessed parts 86, 86, the projecting curved surfaces have symmetry on both sides of a vertex 87*t* of the projecting part 87. The bottom positions 86*c*, 86*c* of the recessed parts 86, 86 on both sides of the projecting part 87 are disposed to have symmetry with reference to the line connecting between the vertex 87*t* and the rotational center Y1 of the shift drum 80.

Thus, at the outer circumferential surface 85*a* of the star-shaped cam 85, a cam profile 85Pr in which the recessed parts 86 and the projecting parts 87 are alternately arranged at an interval of 12 degrees is formed.

With reference to FIG. 7, at the tip of a detent arm 89*a* swingably held on a pivot shaft 89*c*, a roller 89*r* is rotatably held on a roller shaft 89*d*.

Each recessed part 86 of the star-shaped cam 85 form an arc-shaped surface. The radius of the roller 89*r* is substantially equal to the radius of curvature of each recessed part 86 of the star-shaped cam 85.

The detent arm 89*a* is biased to swing by the torsion coil spring 89*s*, thereby pressing the roller 89*r* against the outer circumferential surface 85*a* of the star-shaped cam 85 where the recessed parts 86 and the projecting parts 87 are formed.

The detent mechanism 88 is structured as described above. By the roller 89*r* being pressed against the outer circumferential surface 85*a* of the star-shaped cam 85 fitting into one prescribed recessed part 86, the star-shaped cam 85 and the shift drum 80 are positioned at a prescribed rotational position. This establishes the gear position GP of the shift drum 80.

Figure 8:
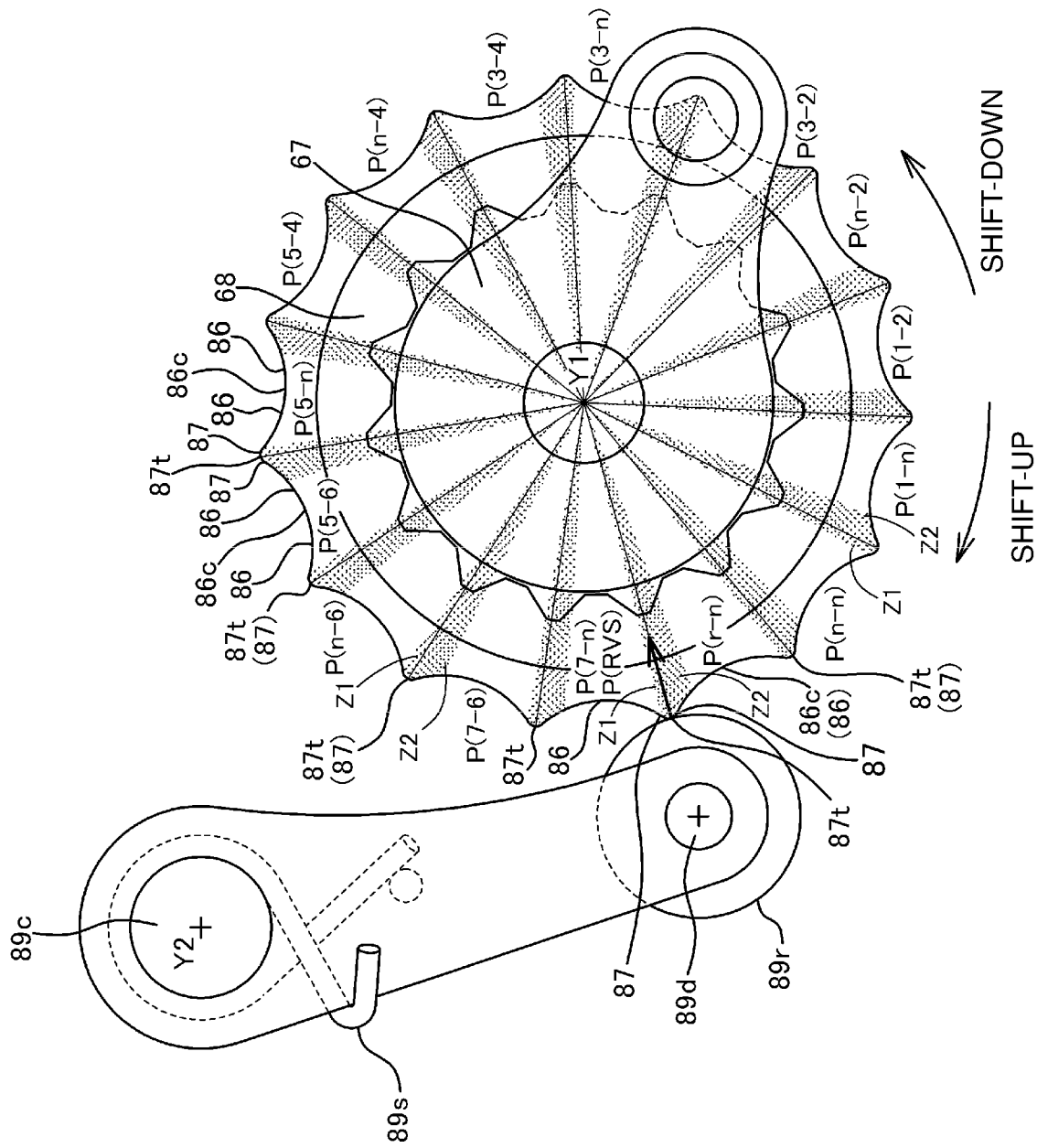
FIG. 8 is a front view of the main part of a detent mechanism.

As illustrated in FIG. 8, at the moment where the torsion coil spring 89*s* causes the roller 89*r* to be pressed against the vertex 87*t* of one projecting part 87 of the star-shaped cam 85, the direction of the pressing force of the roller 89*r* at the vertex 87*t* of the projecting part 87 on which the roller 89*r* abuts on is substantially oriented toward the rotational center Y1 of the shift drum 80. Therefore, the component force of the pressing force in the direction of rotating the star-shaped cam 85 (and the shift drum 80) is substantially 0. Thus, the roller 89*r* little works as the detent mechanism that rotates and guides the star-shaped cam 85 to a prescribed gear position.

The component force of the pressing force of the roller 89*r* in the direction of rotating the star-shaped cam 85 is small also in narrow rotational angle regions (rotational angle regions shaded in FIG. 8) on both sides of the vertex 87t of each projecting part 87 of the star-shaped cam 85. Therefore, the roller 89r little works as the detent mechanism that rotates and guides the star-shaped cam 85 (and the shift drum 80) to a prescribed gear position. The both rotational angle regions represent non-stable-rotation angle regions Z1, Z2 of the shift drum 80 where the shift drum 80 may stop rotating as the detent mechanism.

With reference to FIG. 8, when the torsion coil spring 89s causes the roller 89r to be pressed against the vertex 87t of one projecting part 87 of the star-shaped cam 85, the non-stable-rotation angle region Z1 exists at the inclined surface on the swing center Y2 side of the detent arm 89a out of inclined surfaces on both side of the vertex 87t of the projecting part 87, and the non-stable-rotation angle region Z2 exists at the inclined surface on the side opposite to the swing center Y2 of the detent arm 89a.

Comparing the case where the roller 89r is pressed against the inclined surface on the swing center Y2 side of the detent arm 89a of the projecting part 87 and the case where the roller 89r is pressed against the inclined surface on the side opposite to the swing center Y2 of the detent arm 89a of the projecting part 87 at an identical rotational angle from the vertex 87t of the projecting part 87, the following can be seen. The contact point at the inclined surface on the swing center Y2 side of the projecting part 87 is greater in distance from the swing center Y2 than the inclined surface on the side opposite to the swing center Y2 of the projecting part 87. Therefore, the pressing force of the roller 89r acting on the inclined surface on the swing center Y2 side of the projecting part 87 by the torsion coil spring 89s, and consequently the force of rotating the star-shaped cam 85, is smaller than the pressing force of the roller 89r acting on the inclined surface on the side opposite to the swing center Y2.

Accordingly, as represented by the shading pattern in FIG. 8, at an identical rotational angle from the vertex 87t of the projecting part 87, the non-stable-rotation angle region Z1 corresponding to the inclined surface on the swing center Y2 side, where the force of rotating the star-shaped cam 85 caused by the pressing force of the roller 89r is smaller, is smaller than the non-stable-rotation angle region Z2 corresponding to the inclined surface on the side opposite to the swing center Y2 where such rotating force is greater.

In the present embodiment, the non-stable-rotation angle region Z1 is about 1.7 degrees and the non-stable-rotation angle region Z2 is about 5.1 degrees.

Figure 5:
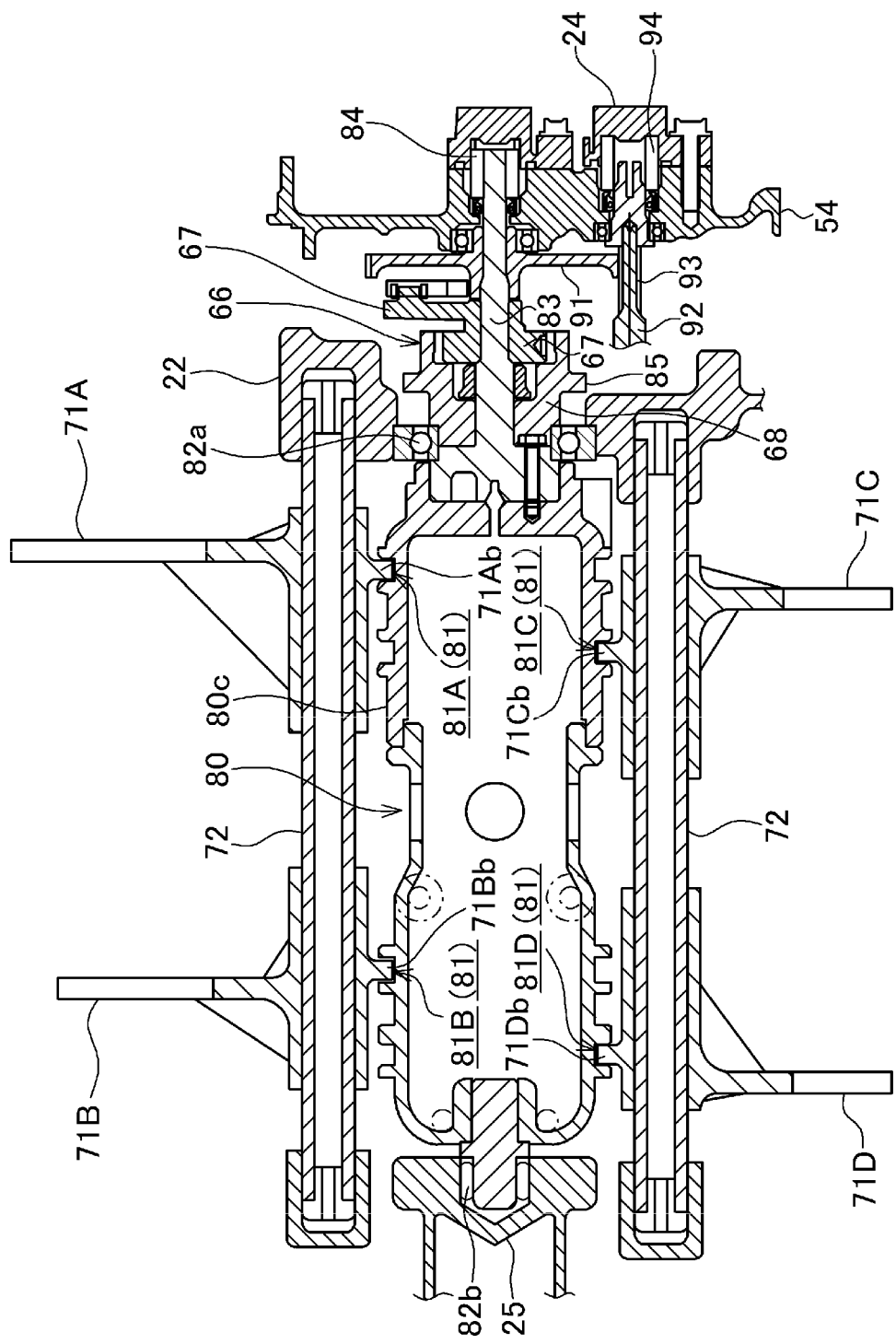
FIG. 5 is a cross-sectional view of the transmission taken along line V-V in FIG. 3.

As illustrated in FIG. 5, the shift drum 80 has a hollow cylindrical shape. The shift drum 80 has its front end 80a rotatably held on the transmission holder 22 via ball bearings 82, and has its rear end (not shown) rotatably held on the rear cover 25 via needle bearings 82b.

Figure 9:
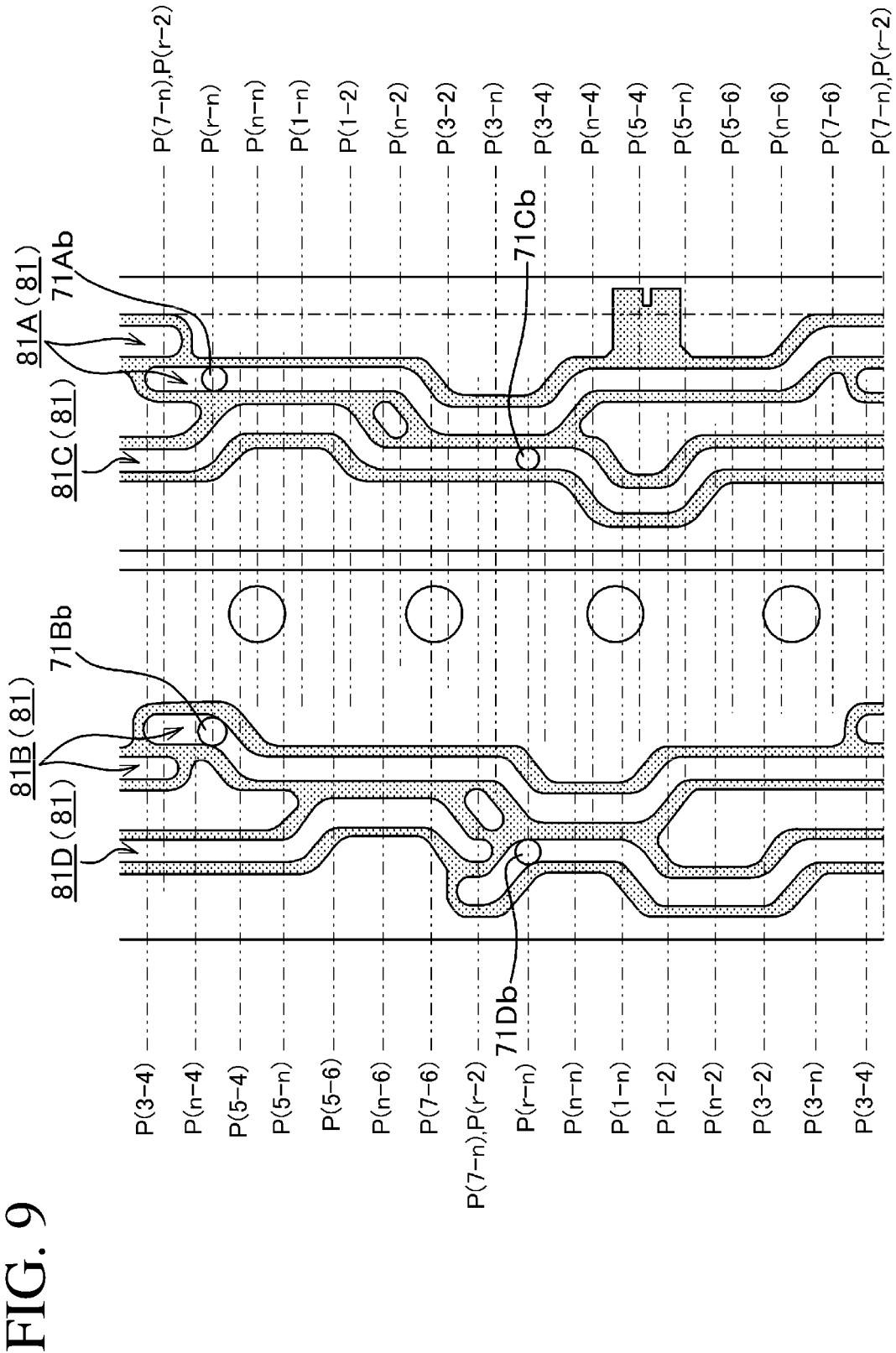
FIG. 9 is a developed view of lead grooves of a shift drum.

FIG. 9 is a developed view of lead grooves 81 of the shift drum 80.

On the shift drum 80, sixteen gear positions GP are sequentially set at an interval of 24 degrees, namely, a reverse position P(RVS), a first neutral position P(r-n), a second neutral position P(n-n), a first speed position P(1-n), a first speed-second speed preparatory position P(1-2), a second speed position P(n-2), a second speed-third speed preparatory position P(3-2), a third speed position P(3-n), a third speed-fourth speed preparatory position P(3-4), a fourth speed position P(n-4), a fourth speed-fifth speed preparatory position P(5-4), a fifth speed position P(5-n), a fifth speed-sixth speed preparatory position P(5-6), a sixth speed position P(n-6), a sixth speed-seventh speed preparatory position P(7-6), and a seventh speed position P(7-n).

As illustrated in FIGS. 5 and 9, four lead grooves 81 are provided in a radial outer circumferential surface 80c of the shift drum 80.

The lead grooves 81 are formed as a pattern that extends in the circumferential direction of the shift drum 80 while partially offset in the axial direction of the shift drum 80.

The lead grooves 81 include a first lead groove 81A, a second lead groove 81B, a third lead groove 81C, and a fourth lead groove 81D.

As illustrated in FIG. 5, the first lead groove 81A slidably engages with a pin part 71Ab of a first shift fork 71A. The second lead groove 81B slidably engages with a pin part 71Bb of the second shift fork 71B. The third lead groove 81C slidably engages with a pin part 71Cb of the third shift fork 71C. The fourth lead groove 81D slidably engages with a pin part 71Db of the fourth shift fork 71D.

When the shift drum 80 rotates, the pin parts 71Ab, 71Bb, 71Cb, 71Db are guided according to the pattern of the lead grooves 81A, 81B, 81C, 81D of the shift drum 80, whereby the shift forks 71A, 71B, 71C, 71D shift in the axial direction on the shift fork shafts 72.

Note that, the shift forks 71A, 71B, 71C, 71D and the shifter gears M3, M6, C4, C5 have positions determined by the lead grooves, namely, three shift positions consisting of "the rear position", "the central position", and "the front position."

As illustrated in FIG. 9, as to three lead grooves 81, namely, the first lead groove 81A, the second lead groove 81B, and the fourth lead groove 81D, the reverse position P(r-2) (identical to P(RVS)) which is the lowermost-position shift stage on the shift-down end and the seventh speed position P(7-n) which is the uppermost-position shift stage on the shift-up end are identical to each other in rotational angle position as the shift drum 80 and displaced from each other in the axial direction.

That is, the lead grooves 81 of the shift drum 80 circumferentially extend from the reverse position P(r-2) on the shift-down end while axially shifting at predetermined locations, to complete a round of 360 degrees around the shift drum 80 by the sixth speed-seventh speed preparatory position P(7-6). The seventh speed position P(7-n) on the shift-up end is at the identical rotational angle position to the reverse position P(r-2) past 360 degrees while axially displaced from each other.

In the case where no synchronous mechanism is built in the transmission, as compared to the case where the synchronous mechanism is built in, the load in switching the shift stage is low. Accordingly, in down-shifting from the first speed position P(1-n), one-stage reduction and reverse setting continuously smoothly proceed and the gear stage is switched to the first neutral position P(n-r) at once.

On the other hand, as the transmission 31, in the case where the synchronous mechanism S is built in, switching the shift stage suffers a relatively high load. Accordingly, down-shifting from the first speed position P(1-n) to the first neutral position P(n-r) cannot be smoothly attained at once. Therefore, the second neutral position P(n-n) which is one-stage reduced is provided between the first speed position P(1-n) and the first neutral position P(r-n).

This addition of the second neutral position P(n-n) to the lead grooves 81 necessitates sequentially positioning sixteen gear positions GP on the outer circumference of the shift drum 80.

It is not desirable to set the sixteen gear positions GP within the range of 360 degrees of the outer circumference of the shift drum 80 without increasing the diameter of the shift drum 80, because it results in steep axial displacement of the lead grooves 81.

Here, as illustrated in FIG. 8, the lead grooves 81 of the shift drum 80 are set so that, past 360 degrees on the outer circumference of the shift drum 80, the reverse position P(RVS) on the shift-down end and the seventh speed position P(7-n) on the shift-up end overlap each other at the identical rotational angle position while axially displaced from each other.

Note that, as to the third lead groove 81C, the reverse position P(RVS) on the shift-down end and the seventh speed position P(7-n) on the shift-up end are not required to be axially displaced from each other and, therefore, they are at an identical position and continuous to each other endlessly.

Accordingly, as illustrated in FIG. 8, the fifteen recessed parts 86 formed at the outer circumferential surface of the star-shaped cam 85, which integrally rotate with the shift drum 80 of the detent mechanism 88, counter-clockwise in sequence correspond to the reverse position P(RVS), the first neutral position P(r-n), the second neutral position P(n-n), the first speed position P (1-n), the first speed-second speed preparatory position P(1-2), the second speed position P(n-2), the second speed-third speed preparatory position P(3-2), the third speed position P(3-n), the third speed-fourth speed preparatory position P(3-4), the fourth speed position P(n-4), the fourth speed-fifth speed preparatory position P(5-4), the fifth speed position P(5-n), the fifth speed-sixth speed preparatory position P(5-6), the sixth speed position P(n-6), and the sixth speed-seventh speed preparatory position P(7-6), and the seventh speed position P(7-n) corresponds to the recessed part 86 similarly to the reverse position P(RVS).

A description will be given of shifting operations of the transmission 31 exemplarily on a shift-up operation from the first neutral position P(r-n) to the second speed position P(n-2).

The developed view of the lead grooves 81 of the shift drum 80 of FIG. 9 illustrates, with the gear position being in the first neutral position P(r-n), the positions of: the pin part 71Ab of the first shift fork 71A in the first lead groove 81A; the pin part 71Bb of the second shift fork 71B in the second lead groove 81B; the pin part 71Cb of the third shift fork 71C in the third lead groove 81C; and the pin part 71Db of the fourth shift fork 71D in the fourth lead groove 81D.

With reference to FIGS. 4 and 9, when the shift drum 80 is at the first neutral position P(r-n), the sixth-speed driving gear M6 engages at the front position with the driven sprocket MT for reverse, whereas the other shifter gears M3, C4, C5 are at the central position where they do not engage with the free gears FG.

As illustrated in FIG. 7, by the roller 89r fitting in and being pressed against the recessed part 86 corresponding to the first neutral position P(r-n) of the star-shaped cam 85, the shift drum 80 is fixed to the first neutral position P(r-n).

At this time, the first hydraulic clutch 40A and the second hydraulic clutch 40B are not supplied with hydraulic pressure and thus not connected.

With reference to FIGS. 4 and 9, when the shift drum 80 is rotated from the first neutral position P(r-n) in the shift-up direction by 24 degrees, the pin part 71Bb of the second shift fork 71B shifts rearward to shift the sixth-speed driving gear M6 to the central position where it does not engage with any free gear FG, thereby canceling the engagement with the driven sprocket MT.

The other shifter gears M3, C4, C5 not shifting are also at the central position where they do not engage with any free gears FG. Thus, the second neutral position P(n-n) is set.

Here, the shift drum 80 is fixed to the second neutral position P(n-n) by the following operation: in the 24-degree-rotation of the star-shaped cam 85, the roller 89r traveling over the projecting part 87 fits and is pressed against the recessed part 86 corresponding to the second neutral position P(n-n) of the star-shaped cam 85.

Next, when the shift drum 80 is rotated from the second neutral position P(n-n) in the shift-up direction by 24 degrees, the pin part 71Cb of the third shift fork 71C shifts rearward, to shift the third-speed driven gear C3 to the rear position and causes the dog tooth D of the third-speed driven gear C3 to mesh with the dog tooth D of the first-speed driven gear C1 through a synchronizing operation of the synchronous mechanism S. Thus, the shift drum 80 is set to the first speed position P(1-n) where the first speed of the transmission 31 is established.

In this state, by the first hydraulic clutch 40A being supplied with hydraulic pressure from the hydraulic circuit 46, rotational driving force is transmitted in order of the first hydraulic clutch 40A, the first main shaft 32A, the first-speed driving gear M1, the first-speed driven gear C1, the third-speed driven gear C3, and the counter shaft 34.

Here, the shift drum 80 is fixed to the first speed position P(1-n) by the following operation: in the 24-degree-rotation of the star-shaped cam 85, the roller 89r traveling over the projecting part 87 fits and is pressed against the recessed part 86 corresponding to the first speed position P(1-n) of the star-shaped cam 85.

Subsequently, when the shift drum 80 is rotated from the first speed position P(1-n) to the shift-up direction further by 24 degrees, the pin part 71Db of the fourth shift fork 71D shifts rearward, to shift the fourth-speed driven gear C4 to the rear position and cause the dog tooth D of the fourth-speed driven gear C4 to engage with the dog tooth D of the second-speed driven gear C2 through a synchronizing operation of the synchronous mechanism S. Thus, the shift drum 80 is set to the first speed-second speed preparatory position P(1-2).

By the roller 89r pressing against the recessed part 86 corresponding to the first speed-second speed preparatory position P(1-2) of the star-shaped cam 85, the shift drum 80 is fixed to the first speed-second speed preparatory position P(1-2).

In this state, since the second hydraulic clutch 40B is disconnected, there is no change in the transmission path of the rotational driving force.

Such a state is referred to as the "preparatory speed change", which is similarly performed in shifting operations from the first speed position P(1-n) to the seventh speed position P(7-n).

When a shift-up operation from the first speed to the second speed is performed in the state of the first speed-second speed preparatory position P(1-2), a switching operation of the hydraulic clutch 40 is performed so that the hydraulic circuit 46 disconnects the first hydraulic clutch 40A and connects the second hydraulic clutch 40B.

This switching operation attains smooth shifting up to the second speed without inviting a so-called torque loss. The rotational driving force is transmitted in order of the second hydraulic clutch 40B, the second main shaft 32B, the second-speed driving gear M2, the second-speed driven gear C2, the fourth-speed driven gear C4, and the counter shaft 34.

When the shift drum 80 is rotated in the shift-up direction further by 24 degrees and the pin part 71Cb of the third shift fork 71C shifts frontward to shift the third-speed driven gear C3 to the central position, the shift drum 80 is set to the second speed position P(n-2) where the second speed of the transmission 31 is established.

At this time, by the roller 89r being pressed against the recessed part 86 corresponding to the second speed position P(n-2) of the star-shaped cam 85, the shift drum 80 is fixed to the second speed position P(n-2).

Next, a description will be given of the shift drum angle detecting device 100 of the present invention.

As described above, at the front end of the first sensor shaft 83 which is a shaft extended frontward on the rotational central axis from the front end of the shift drum 80, the first angle sensor 84 is provided.

In addition to the first angle sensor 84, the shift drum angle detecting device 100 includes a second angle sensor 94 (see FIG. 6).

As illustrated in FIG. 6, on the left side of the first sensor shaft 83 and the circumferentially outer side of a speed increasing driving gear 91, a second sensor shaft 92 is disposed in parallel with the first sensor shaft 83. The second sensor shaft 92 has its front end 92a rotatably held by an opening 23b formed at the change system holder 23 via ball bearings 96a and has its rear end 92b rotatably held on the transmission holder 22 via the ball bearings 96b.

To the front end 92a of the second sensor shaft 92, the second angle sensor 94 configured to detect the shaft rotational angle of the second sensor shaft 92 is connected.

The speed increasing driving gear 91 of a greater diameter integrally fitted to the first sensor shaft 83 and a speed increasing driven gear 93 of a smaller diameter formed at the second sensor shaft 92 meshing with each other form the speed increasing mechanism 90.

In the present embodiment, the speed increasing ratio Ra of the speed increasing mechanism 90 is set to "15".

For each gear position GP, the second sensor shaft 92 makes one turn. For one rotation of the shift drum 80, the second sensor shaft 92 makes fifteen turns.

The first angle sensor 84 and the second angle sensor 94 are each formed of, for example, a potentiometer, and juxtaposed to each other on the left and right sides at the front surface of the change system holder 23 (see FIG. 3).

The first angle sensor 84 detects a shaft rotational angle a1 of the first sensor shaft 83 which integrally rotates with the shift drum 80. A first sensor output value Vout1, which is voltage output according to the shaft rotational angle a1 of the first sensor shaft 83, is input to an ECU (not shown).

The second angle sensor 94 detects a shaft rotational angle a2 of the second sensor shaft 92. A second sensor output value Vout2, which is voltage output according to the shaft rotational angle a2 of the second sensor shaft 92, is input to the ECU.

Figure 10:
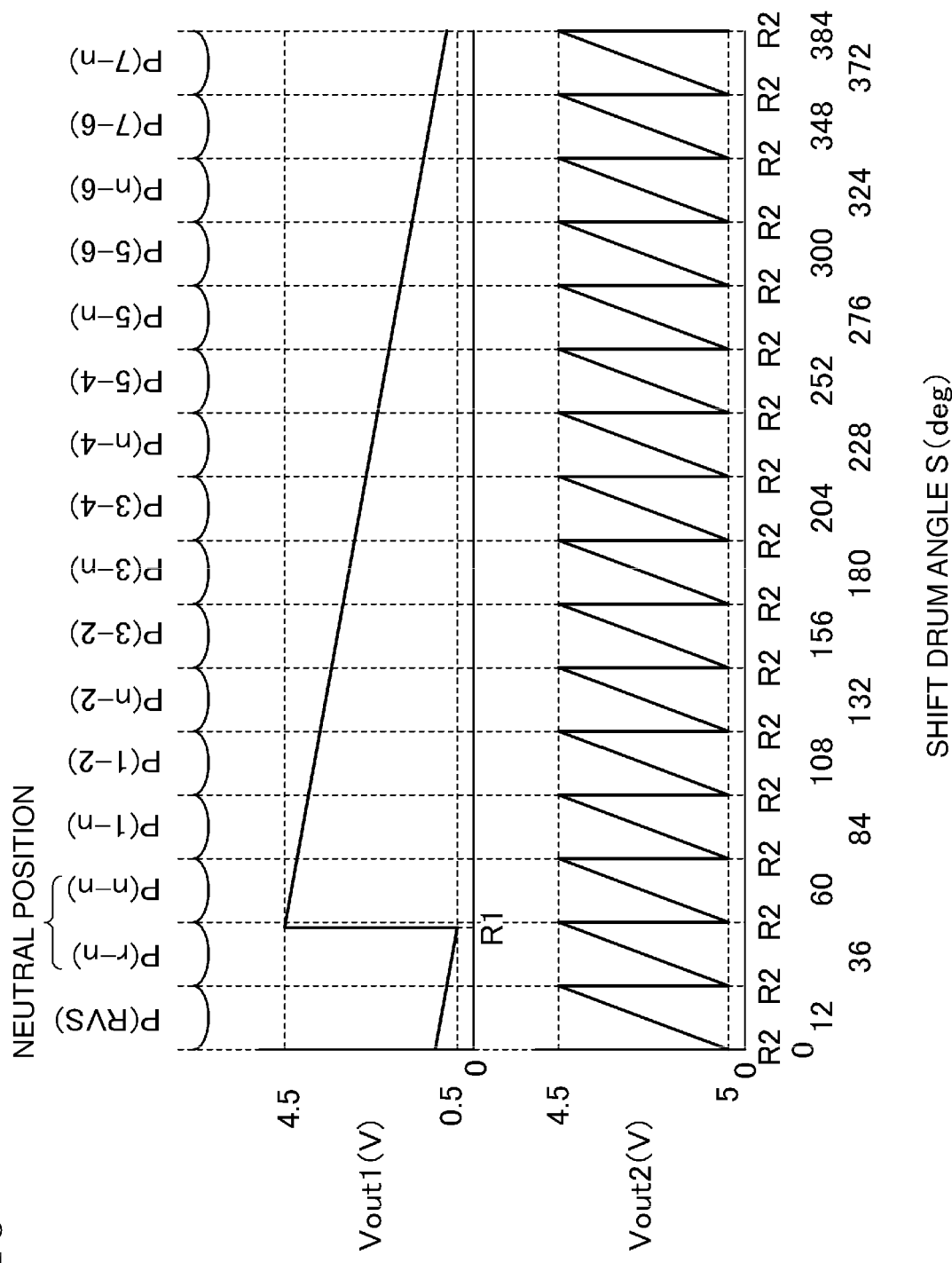
FIG. 10 is an output profile diagram of a first angle sensor and a second angle sensor.

FIG. 10 is an output profile diagram of the first sensor output value Vout1 of the first angle sensor 84 and the second sensor output value Vout2 of the second angle sensor 94 in the gear positions GP of the shift drum 80.

In the output profile diagram of FIG. 10, the horizontal axis indicates the rotational angle of the shift drum 80.

The shift drum angle S is based on that the rotational angle of the shift drum 80 at the vertex 87t of the projecting part 87 on the shift-down side relative to the recessed part 86 corresponding to the reverse position P(RVS) of the star-shaped cam 85 integrally rotating with the shift drum 80 is 0 degrees.

That is, the shift drum angle S detected in the present embodiment is an angle rotated toward shift-up side with reference to 0 degrees at the vertex 87a of the projecting part 87 on the shift-down side relative to the recessed part 86 corresponding to the reverse position P(RVS), which is the lowermost-position shift stage on the shift-down end.

In the output profile diagram of FIG. 10, the horizontal axis indicates the shift drum angle S.

FIG. 8 illustrates the state of the detent mechanism 88 where the shift drum angle is 24 degrees.

That is, the roller 89r provided at the tip of the swingably biased detent arm 89a of the detent mechanism 88 presses the vertex 87a of the projecting part 87 positioned between the recessed part 86 corresponding to the reverse position P(RVS) of the star-shaped cam 85 integrally rotating with the shift drum 80 and the recessed part 86 corresponding to the first neutral position P(r-n).

When the shift drum 80 has rotated by 12 degrees in shift drum angle from 24 degrees toward the shift-down side, the roller 89r fits and presses the recessed part 86 corresponding to the reverse position P(RVS) of the star-shaped cam 85, whereby the reverse position P(RVS) is established. On the other hand, when the shift drum 80 has rotated by 12 degrees toward the shift-up side, the roller 89 fits and presses the recessed part 86 corresponding to the first neutral position P(r-n) of the star-shaped cam 85, whereby the first neutral position P(r-n) is established.

When the shift drum 80 has rotated by 24 degrees toward the shift-up side from the first neutral position P(r-n), the second neutral position P(n-n) is established. From there, every 24 degree-rotation toward the shift-up side, what are established are the first speed position P(1-n), the first speed-second speed preparatory position P(1-2), the second speed position P(n-2), the second speed-third speed preparatory position P(3-2), the third speed position P(3-n), the third speed-fourth speed preparatory position P(3-4), the fourth speed position P(n-4), the fourth speed-fifth speed preparatory position P(5-4), the fifth speed position P(5-n), the fifth speed-sixth speed preparatory position P(5-6), the sixth speed position P(n-6), and the sixth speed-seventh speed preparatory position P(7-6) which is 348 degrees in shift drum angle.

The shift drum 80 can further rotate from the sixth speed-seventh speed preparatory position P(7-6) by 24 degrees toward the shift-up side, past one rotation of 360 degrees to reach the seventh speed position P(7-n) which is 372 degrees in shift drum angle.

The seventh speed position P(7-n) which is reached by the shift drum 80 having rotated by 372 degrees from 0 degrees in shift drum angle is identical in rotational angle position to the reverse position P(RVS) reached by the shift drum 80 having rotated by 12 degrees from 0 degrees. That is, at an identical rotational angle position of the shift drum 80, different shift stages, namely, the reverse position P(RVS) and the seventh speed position P(7-n), exist.

As has been described above, in the developed view of the lead grooves 81 of the shift drum 80 of FIG. 9, as to the three lead grooves 81 of the first lead groove 81A, the second lead groove 81B, and the fourth lead groove 81D, the reverse position P(RVS) and the seventh speed position P(7-n) are at an identical rotational angle position as the shift drum 80 while axially displaced from each other.

The first angle sensor 84 detects the shaft rotational angle a1 of the first sensor shaft 83 integrally rotating with the shift drum 80. During one rotation of the first sensor shaft 83, the first sensor output value Vout1, which is the voltage being output, changes between the minimum value 0.5 V and the maximum value 4.5 V at a constant change rate. The minimum value 0.5 V and the maximum value 4.5 V are switched at a first sensor switching angle R1.

The second angle sensor 94 detects the shaft rotational angle a2 of the second sensor shaft 92 as a result of the rotation of the first sensor shaft 83 integrally rotating with the shift drum 80 being increased by the speed increasing ratio Ra of "15". During one rotation of the second sensor shaft 92, the second sensor output value Vout2, which is the voltage being output, changes between the minimum value 0.5 V and the maximum value 4.5 V at a constant change rate. The minimum value 0.5 V and the maximum value 4.5 V are switched at the second sensor switching angle R2.

Note that, some angle sensors may fail to accurately output values between the minimum value and the maximum value. That is, some angle sensors may have a so-called deadband.

With reference to FIG. 10, on the second angle sensor 94, the second sensor switching angle R2 of the shift drum angle of the shift drum 80 where the minimum value 0.5 V and the maximum value 4.5 V of the second sensor output value Vout2 are switched is set at reference 0 degrees and every 24 degrees from 0 degrees, namely, 24 degrees, 48 degrees, 72 degrees, ..., ..., and 360 degrees.

The second sensor output value Vout2 of the second angle sensor 94 increases at a constant increasing rate from the minimum value 0.5 V to the maximum value 4.5 V toward the shift-up side at the shift drum angle ranges of 0 degrees to 24 degrees, 24 degrees to 48 degrees, 48 degrees to 72 degrees, ..., ..., 360 degrees to 384 degrees where the gear positions GP exist. Accordingly, as depicted in FIG. 10, the second sensor output value Vout2 presents a saw-notched output profile.

Each gear positions GP is positioned at the bottom position 86c at the center of corresponding recessed part 86 formed at the outer circumferential surface of the star-shaped cam 85. The gear position GP is positioned every 24 degrees from 12 degrees in shift drum angle, namely, 36 degrees, 60 degrees, 84 degrees, ..., ..., and 372 degrees.

It is critical to precisely detect the rotational angle position of each gear position GP. The second angle sensor 94 has the second sensor switching angle R2 with an unstable second sensor output value Vout2 set to the farthest position from the rotational angle position of the gear positions GP. The rotational angle position of each gear position GP is set to the central position in the range where the second sensor output value Vout2 changes at a constant change rate. Thus, the rotational angle position of each gear position GP is highly precisely detected.

On the other hand, the first angle sensor 84 has the first sensor switching angle R1 where the first sensor output value Vout1 is switched between the minimum value 0.5 V and the maximum value 4.5 V set to an angle range including just the neutral positions (the first neutral position P(r-n) and the second neutral position P(n-n)).

By virtue of setting the first sensor switching angle R1 to fall within the angle range including just the neutral positions where delicate control such as in a gear-in mode is not necessary and not setting the first sensor switching angle R1 to the gear positions other than the neutral positions, the rotational angle of the shift drum at the gear positions other than the neutral positions is precisely detected. This realizes delicate control such as in a gear-in mode.

Note that, the second sensor switching angle R2 where the second sensor output value Vout2 of the second angle sensor 94 is unstable is also in the angle range including just the neutral positions (the first neutral position P(r-n) and the second neutral position P(n-n)).

Figure 11:
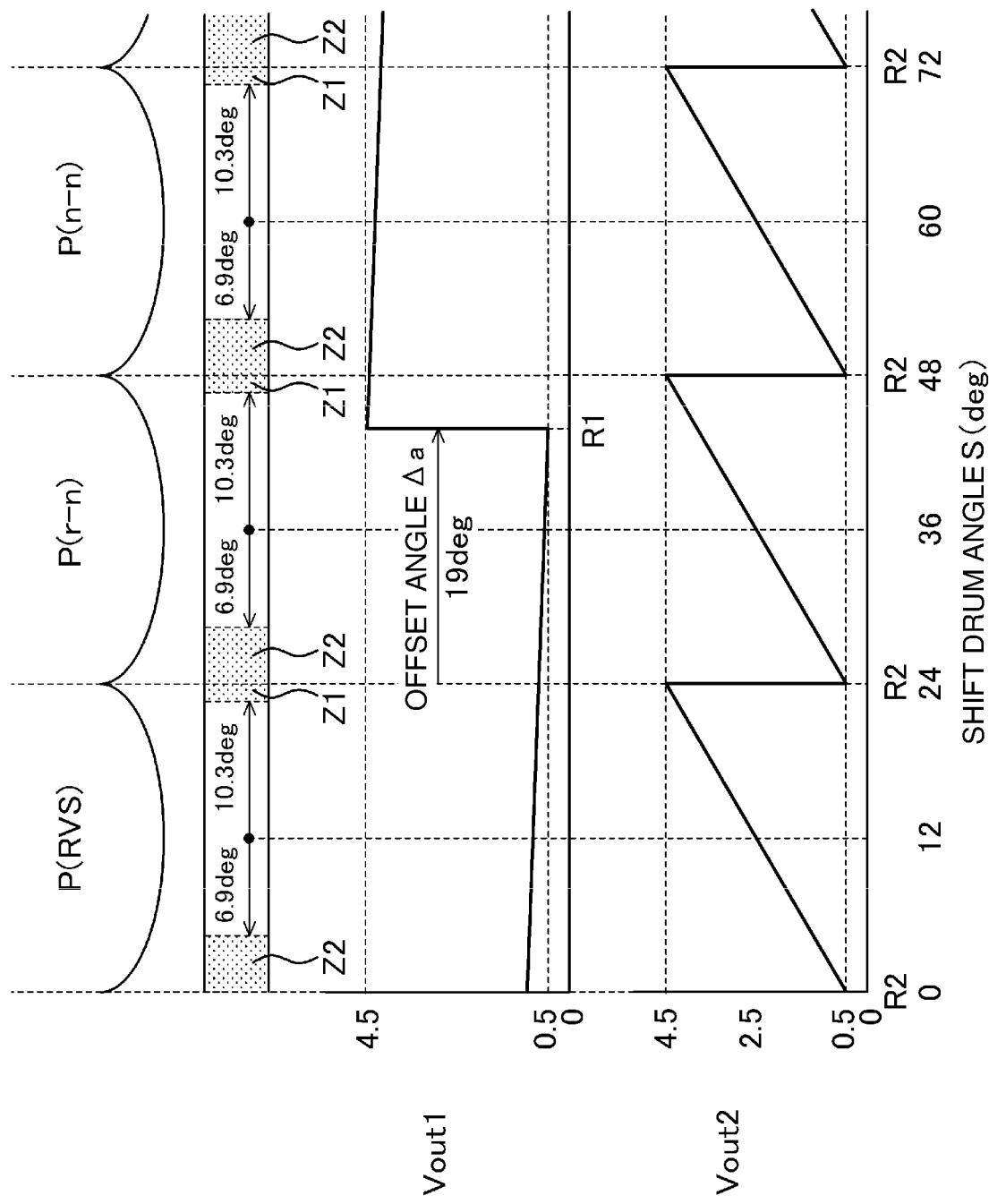
FIG. 11 is an enlarged diagram of the main part of the output profile.

With reference to FIG. 11, in the present embodiment, the first sensor switching angle R1 of the first angle sensor 84 is set, between the rotational angle (shift drum angle 36 degrees) of the bottom position 86c at the center of the recessed part 86 corresponding to the first neutral position P(r-n) of the star-shaped cam 85 and the rotational angle (shift drum angle 48 degrees) of the vertex 87t of the shift-up side projecting part 87, toward the shift-up side projecting part 87.

More specifically, the first sensor switching angle R1 of the first angle sensor 84 is set, between the rotational angle (shift drum angle 36 degrees) of the bottom position 86c at the center of the recessed part 86 corresponding to the first neutral position P(r-n) of the star-shaped cam 85 and the rotational angle (shift drum angle 48 degrees) of the vertex 87t of the shift-up side projecting part 87, toward a non-stable-rotation angle region Z1 (shift drum angle 46.3 degrees to 48 degrees) of the shift-up side projecting part 87 where the rotation of the shift drum 80 may possibly stop, but not in the non-stable-rotation angle region Z1.

In the present embodiment, defining the rotational angle (shift drum angle 24 degrees) of the vertex 87t of the projecting part 87 between the reverse position P(RVS) on the shift-down side relative to the first neutral position P(r-n) and the first neutral position P(r-n) as the reference point, the first sensor switching angle R1 is set to the rotational angle (shift drum angle 43 degrees) which is offset by an offset angle Δa (19 degrees) toward the shift-up side from the reference point (see FIG. 11).

As depicted in FIG. 10, the first sensor output value Vout1 of the first angle sensor 84 switches from the minimum value 0.5 V to the maximum value 4.5 V at the first sensor switching angle R1. As represented in the output profile, the first sensor output value Vout1 reduces at a constant reduction rate from the maximum value 4.5 V at the first sensor switching angle R1 toward the shift-up side during one rotation. When one rotation has completed and the first sensor switching angle R1 is recovered, the first sensor output value Vout1 becomes the minimum value 0.5 V.

Around the center of the curved recessed part 86 of the star-shaped cam 85, the shift stage is established. Accordingly, the rotational angle of the shift drum here must be detected with high precision.

In the present embodiment, the first sensor switching angle R1 where the first sensor output value Vout1 of the first angle sensor 84 is unstable is set between the rotational angle of the bottom position 86c at the center of the recessed part 85 of the star-shaped cam 85 and the rotational angle of the vertex 87t of the shift-up side projecting part 87 continuous to the recessed part 85 and toward the projecting part 87. This realizes highly precise detection of the rotational angle of the shift drum 80 around the center of the recessed part 85 of the star-shaped cam 85 where the shift stage is established.

Furthermore, with reference to FIG. 7, in the state where the roller 89r fits into the recessed part 86 of the first neutral position P(r-n) of the star-shaped cam 85, the first sensor switching angle R1 is set to the rotational angle toward, out of the projecting parts 87, 87 on both sides and continuous to the recessed part 86, the projecting part 87 farther from the swing center Y2 of the detent arm 88b (on the shift-up side, that is, on the second neutral position P(n-n) side) and toward the non-stable-rotation angle region Z1 of the narrower angle range of the projecting part 87.

The non-stable-rotation angle region Z1 is narrower in angle range than the non-stable-rotation angle region Z2. Accordingly, by virtue of the first sensor switching angle R1 being set to the wider angle range between the center of the recessed part 86 and the shift-up side non-stable-rotation angle region Z1, the first sensor switching angle R1 is allowed to be set to the farthest possible position from the center of the recessed part 86 while avoiding overlapping with the non-stable-rotation angle region Z1. This realizes highly precise detection of the rotational angle of the shift drum over a wider range around the center of the recessed part 86 of the star-shaped cam 85 where the shift stage is established, while minimizing the influence of the first sensor switching angle R1.

In the shift drum angle detecting device 100, the ECU receives and processes the first sensor output value Vout1 of the first angle sensor 84 and the second sensor output value Vout2 of the second angle sensor 94 at prescribed timing, to detect the rotational angle (shift drum angle S) of the shift drum 80.

With reference to the flowcharts of FIGS. 12 to 15, a description will be given of the flow of the ECU detecting the shift drum angle S.

Figure 12:
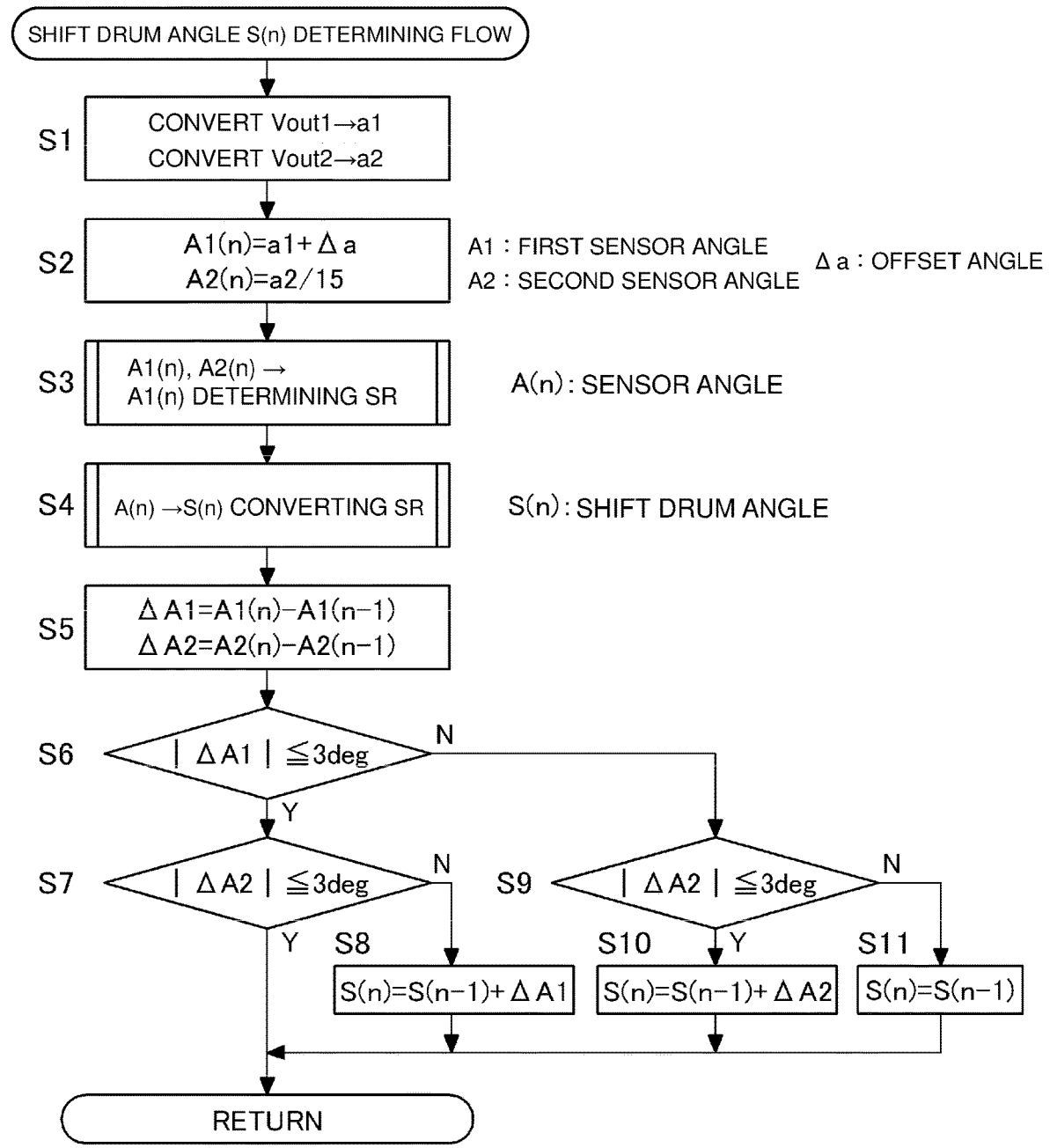
FIG. 12 is a flowchart of determining the shift drum angle of the shift drum.

In the shift drum angle S(n) determining flow of FIG. 12, firstly, in Step S1, on the basis of a previously provided characteristic graph, the first sensor output value Vout1 of the first angle sensor 84 is converted to the shaft rotational angle a1 of the first sensor shaft 83 and the second sensor output value Vout2 of the second angle sensor 94 is converted to the shaft rotational angle a2 of the second sensor shaft 92.

The shaft rotational angle a1 of the first sensor shaft 83 is the rotational angle of the shift drum 80 from the first sensor switching angle R1. The shaft rotational angle a2 of the second sensor shaft 92 is the shaft rotational angle from the second sensor switching angle R2 of the second sensor shaft 92 as a result of the rotation of the shift drum 80 increased by the speed increasing ratio Ra of "15".

In Step S2, the offset angle Δa is added to the shaft rotational angle a1 of the first sensor shaft 83, to obtain the rotational angle of the shift drum 80 from the reference point (shift drum angle 24 degrees) as the first sensor angle A1(n) (see FIG. 11). The shaft rotational angle a2 of the second sensor shaft 92 is divided by the speed increasing ratio 15, to obtain the second sensor angle A2(n), which is the rotational angle of the shift drum 80 from the second sensor switching angle R2.

Next, in Step S3, from the first sensor angle A1(n) and the second sensor angle A2(n), a sensor angle A(n) which is a highly precise rotational angle from the reference point of the shift drum 80 is determined.

Figure 13:
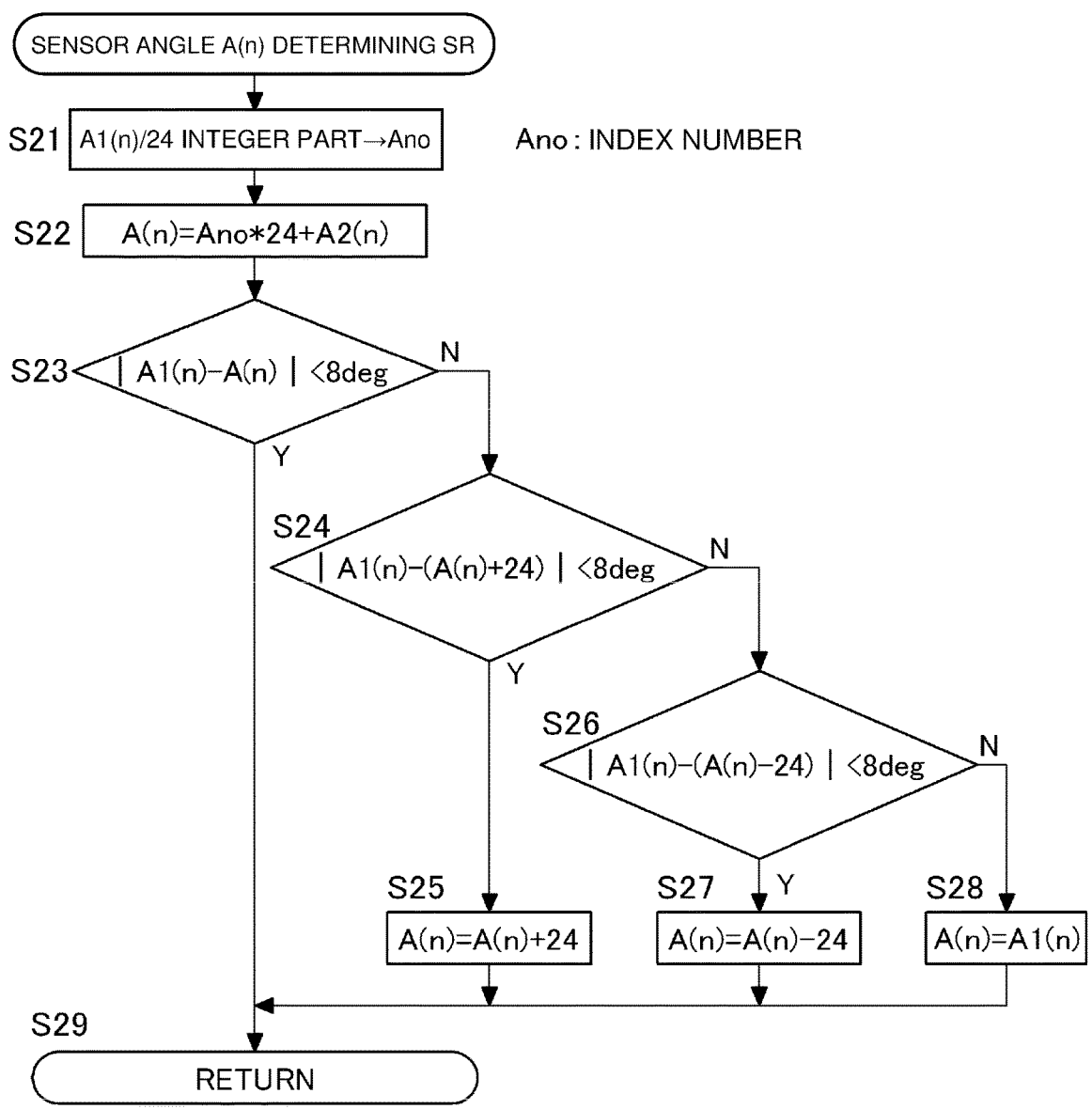
FIG. 13 is a flowchart of a sensor angle determining sub-routine.

Processes in Step S3 are presented as a sensor angle A(n) determining sub-routine in FIG. 13.

In Step S21 of the sensor angle A(n) determining sub-routine, since the first sensor angle A1(n) is lower in precision than the second sensor angle A2(n), a rough gear position is obtained as an index number Ano from the first sensor angle A1(n).

That is, the integer part of the quotient as a result of dividing the first sensor angle A1(n) by 24 is obtained as the index number Ano.

The index number Ano thus calculated represents the gear positions arranged from the reference point (shift drum angle 24 degrees) toward the shift-up side by the numbers of 0 to 15, which gear positions are: the first neutral position P(r-n), the second neutral position P(n-n), the first speed position P(1-n), first speed-second speed preparatory position P(1-2), the second speed position P(n-2), the second speed-third speed preparatory position P(3-2), the third speed position P(3-n), the third speed-fourth speed preparatory position P(3-4), the fourth speed position P(n-4), the fourth speed-fifth speed preparatory position P(5-4), the fifth speed position P(5-n), the fifth speed-sixth speed preparatory position P(5-6), the sixth speed position P(n-6), the sixth speed-seventh speed preparatory position P(7-6), and the seventh speed position P(7-n).

Next, in Step S22, using the index number Ano and the second sensor angle A2(n), the sensor angle A(n) which is the rotational angle from the reference point is obtained from the following equation:

$$A(n) = Ano*24 + A2(n)$$

That is, by multiplying the index number Ano by 24 degrees and adding the second sensor angle A2(n), the sensor angle A(n) from the reference point is obtained.

This sensor angle A(n) is derived from the index number Ano calculated using the first sensor angle A1(n) which is less precise. Therefore, this sensor angle A(n) is one sensor angle candidate that may be the sensor angle A(n). Other possible sensor angle candidates include the sensor angle A(n) with a next-higher-order index number Ano and the sensor angle A(n) with a next-lower-order index number Ano.

Accordingly, out of the sensor angle candidates, the sensor angle A(n) whose difference from the first sensor angle A1(n) falls within a tolerance is selected.

That is, in Step S23, whether or not the difference between the sensor angle A(n) calculated in Step S22 and the first sensor angle A1(n) falls within the tolerance is determined. When the difference falls within the tolerance, control exits the routine and the sensor angle A(n) calculated in Step S22 is selected and determined.

In the present embodiment, the tolerance is 8 degrees.

When the difference does not fall within the tolerance in Step S23, control proceeds to Step S24, to determine whether or not the difference between the sensor angle A(n) with a next-higher-order index number Ano (=A(n)+24) and the first sensor angle A1(n) falls within the tolerance. When the difference falls within the tolerance, control proceeds to Step S25, to select the sensor angle A(n) with the next-higher-order index number Ano (=A(n)+24).

When the difference does not fall within the tolerance in Step S24, control jumps to Step S26, to determine whether or not the difference between the sensor angle A(n) with a next-lower-order index number Ano (=A(n)−24) and the first sensor angle A1(n) falls within the tolerance. When the difference falls within the tolerance, control proceeds to Step S27, to select the sensor angle A(n) with the next-lower-order index number Ano (=A(n)−24).

When the difference does not fall within the tolerance in Step S26, control jumps to Step S28, to select the first sensor angle A1(n) as the sensor angle A(n).

That is, out of the sensor angle A(n) calculated in Step S22, the sensor angle A(n) with the next-higher-order index number Ano (=A(n)+24), and the sensor angle A(n) with the next-lower-order index number Ano (=A(n)−24), the sensor angle A(n) closest to the first sensor angle A1(n) within 8 degrees is selected.

In this manner, the most possible sensor angle A(n) is selected and determined, and control exits the sensor angle A(n) determining sub-routine.

When control exits the sensor angle A(n) determining sub-routine, control proceeds to Step S4 in the shift drum angle S(n) determining flowchart of FIG. 12, where the shift drum angle S(n) is determined from the determined sensor angle A(n).

Figure 14:
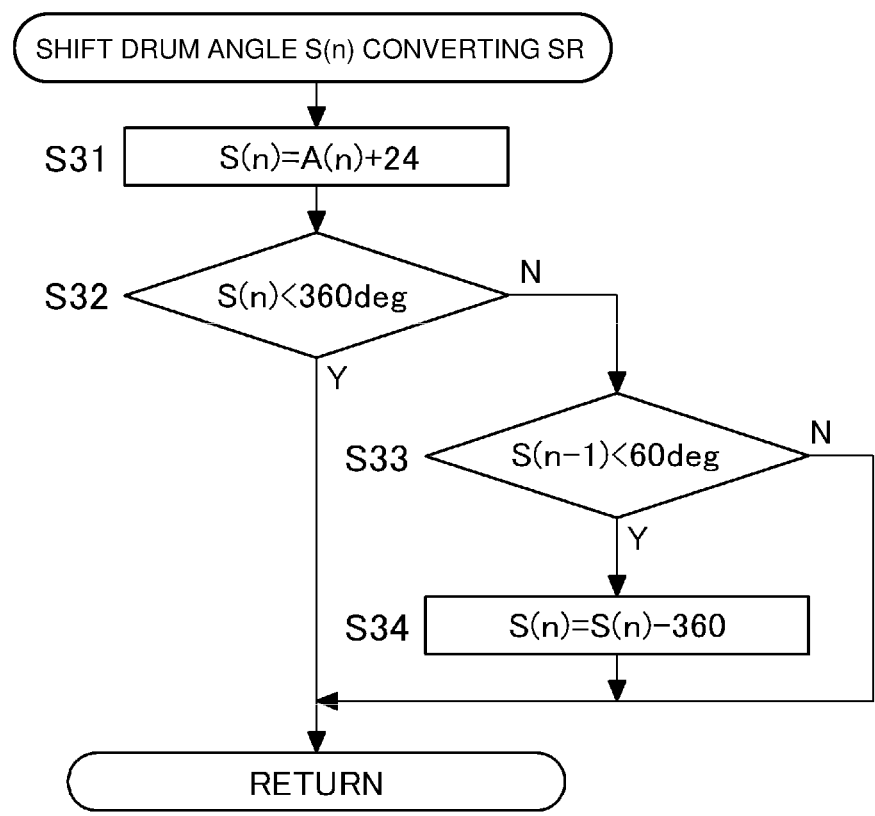
FIG. 14 is a flowchart of a shift drum angle converting sub-routine.

Processes in Step S4 are presented as a shift drum angle S(n) converting sub-routine in FIG. 14.

The sensor angle A(n) determined in the sensor angle A(n) determining sub-routine corresponds to the rotational angle of the shift drum 80 from the reference point (shift drum angle 24 degrees). Accordingly, in Step S31 of the shift drum angle S(n) converting sub-routine, 24 degrees is added to the sensor angle A(n), to obtain the shift drum angle S(n).

With reference to the output profile diagram in FIG. 10, in the shift drum angle S, the vertex 87a of the projecting part 87 on the shift-down side relative to the recessed part 86 corresponding to the reverse position P(RVS) (the seventh speed position P(7-n)) is 0 degrees. The vertex 87a of the projecting part 87 on the shift-up side relative to the recessed part 86 corresponding to the sixth speed-seventh speed preparatory position P(7-6) is 360 degrees.

Next, in Step S32, whether or not the shift drum angle S(n) obtained in Step S31 is less than 360 degrees is determined. When the shift drum angle S(n) is less than 360 degrees, the shift drum angle S(n) obtained in Step S31 is selected as the shift drum angle S(n) as it is and control exits the sub-routine.

In Step S32, when it is determined that the shift drum angle S(n) obtained in Step S31 is 360 degrees or more, control proceeds to Step S33, to determine whether or not the previous value S(n−1) of the shift drum angle S is less than 60 degrees.

When the shift drum angle S(n) is 360 degrees or more, there are two possible states, namely, the state where the gear position GP is at the seventh speed position P(7-n) and the state where the gear position GP is at the reverse position P(RVS). Therefore, in Step S33, the current state is determined taking into account of the previous value S(n−1) of the shift drum angle S.

That is, when it is determined that the previous value S(n−1) of the shift drum angle S is less than 60 degrees in Step S33, control proceeds to Step 34, where 360 degrees is subtracted from the shift drum angle S(n) obtained in Step S31 to obtain the shift drum angle S(n) and control exits the sub-routine. When it is determined that the previous value S(n−1) of the shift drum angle S is 60 degrees or more in Step S33, the shift drum angle S(n) obtained in Step S31 is selected as the shift drum angle S(n) as it is and control exits the sub-routine.

In this manner, when control exits the shift drum angle S(n) converting sub-routine in FIG. 14 and the sensor angle A(n) is converted to the shift drum angle S(n), control proceeds to Step S5 in the shift drum angle S(n) determining flow presented in FIG. 12.

In Step S5, the previous value A1(n−1) is subtracted from the current value A1(n) of the first sensor angle A1, to obtain the change amount ΔA1 of the first sensor angle A1(n). The previous value A2(n−1) is subtracted from the current value A2(n) of the second sensor angle A2, to obtain the change amount ΔA2 of the second sensor angle A2(n).

When the absolute value |ΔA1| of the change amount ΔA1 of the first sensor angle A1(n) is 3 degrees or less, the first sensor angle A1 is not at the first sensor switching angle R1 where the first sensor output value Vout1 of the first angle sensor 84 is switched between the minimum value 0.5 V and the maximum value 4.5 V. Therefore, the first sensor angle A1 is a stable value and adaptable in determining the sensor angle A(n).

On the other hand, when the absolute value |ΔA1| of the change amount ΔA1 of the first sensor angle A1(n) exceeds 3 degrees, the first sensor angle A1 may be at the first sensor switching angle R1 and detecting the first sensor switching angle R1. Since the first sensor angle A1 is an unstable value, it is not adaptable in determining the sensor angle A(n).

Similarly, when the absolute value |ΔA2| of the change amount ΔA2 of the second sensor angle A2(n) is 3 degrees or less, the second sensor angle A2 is not at the second sensor switching angle R2 where the second sensor output value Vout2 of the second angle sensor 94 is switched between the minimum value 0.5 V and the maximum value 4.5 V. Therefore, the second sensor angle A2 is a stable value and adaptable in determining the sensor angle A(n).

However, when the absolute value |ΔA2| of the change amount ΔA2 of the second sensor angle A2(n) exceeds 3 degrees, the second sensor angle A2 may be at the second sensor switching angle R2 and detecting the second sensor switching angle R2. Since the second sensor angle A2 is an unstable value, it is not adaptable in determining the sensor angle A(n).

Accordingly, in Step S6, whether or not the absolute value |ΔA1| of the change amount ΔA1 of the first sensor angle A1(n) is 3 degrees or less is determined. When |ΔA1| is 3 degrees or less, control proceeds to Step S7. When |ΔA1| exceeds 3 degrees, control jumps to Step S9.

In Step S7, whether or not the absolute value |ΔA2| of the change amount ΔA2 of the second sensor angle A2(n) is 3 degrees or less is determined. When |ΔA2| is 3 degrees or less, control exits the routine. When |ΔA2| exceeds 3 degrees, the control jumps to Step S8.

When both of |ΔA1| and |ΔA2| are 3 degrees or less and the first sensor angle A1 and the second sensor angle A2 do not respectively detect the first sensor switching angle R1 and the second sensor switching angle R2 and both are adaptable, control proceeds from Step S6 to Step S7 and exits the routine. Thus, since the sensor angle A(n) is previously determined using the adaptable first sensor angle A1 and second sensor angle A2 in the sensor angle A(n) determining sub-routine in Step 3, the determined sensor angle A(n) is highly precise. Thus, the shift drum angle S(n) obtained by converting the precise sensor angle A(n) through the shift drum angle S(n) converting sub-routine in Step S4 holds high precision.

When |ΔA1| is 3 degrees or less and the first sensor angle A1 is adaptable but |ΔA2| exceeds 3 degrees and the second sensor angle A2 detecting the second sensor switching angle R2 is not adaptable, control proceeds from Step S7 to Step S8, where the adaptable change amount ΔA1 of the first sensor angle A1 is added to the previous value S(n−1) of the shift drum angle S to obtain the shift drum angle S(n). Thus, control exits the routine.

This shift drum angle S(n) (=S(n−1)+ΔA1) is derived from the change amount ΔA1 of the adaptable first sensor angle A1 avoiding the change amount ΔA2 of the unstable second sensor angle A2 and, therefore, it holds high precision.

When |ΔA1| exceeds 3 degrees, control jumps from Step S6 to Step S9. In Step S9, whether or not |ΔA2| is 3 degrees or less is determined.

When |ΔA1| exceeds 3 degrees and the first sensor angle A1 is detecting the first sensor switching angle R1 which is unstable and not adaptable but |ΔA2| is 3 degrees or less and the second sensor angle A2 is adaptable, control jumps from Step S6 to Step S9, and proceeds from Step S9 to Step S10, where the change amount ΔA2 of the adaptable second sensor angle A2 is added to the previous value S(n−1) of the shift drum angle S to obtain the shift drum angle S(n). Thus, control exits the routine.

This shift drum angle S(n) (=S(n−1)+ΔA2) is derived from the change amount ΔA2 of the adaptable second sensor angle A2 avoiding the change amount ΔA1 of the unstable first sensor angle A1 and, therefore, it holds high precision.

Note that, since the first sensor switching angle R1 and the second sensor switching angle R2 are set to shift drum angles which are different from each other, it is not likely that both |ΔA1| and |ΔA2| simultaneously exceed 3 degrees. However, when such a situation is invited by any factor, control proceed from Step S9 to Step S11 to select the previous value S(n−1) of the shift drum angle S as the shift drum angle S(n). Thus, control exits the routine.

Based on that |ΔA1| and |ΔA2| exceed 3 degrees, the first sensor angle A1 and the second sensor angle A2 are unstable values and therefore not adapted. Instead, the previous value S(n−1) of the shift drum angle S is determined as the shift drum angle S(n). Thus, an erroneous determination is avoided and the mediocre shift drum angle S(n) of acceptable precision is determined.

As has been described above, when |ΔA2| exceeds 3 degrees and the second sensor angle A2 is detecting the second sensor switching angle R2, the change amount ΔA1 of the adaptable first sensor angle A1 is added to the previous value S(n−1) of the shift drum angle S, to obtain the shift drum angle S(n) (=S(n−1)+ΔA1) (Step S8). When |ΔA1| exceeds 3 degrees and the first sensor angle A1 is detecting the first sensor switching angle R1, the change amount ΔA2 of the adaptable second sensor angle A2 is added to the previous value S(n−1) of the shift drum angle S, to obtain the shift drum angle S(n) (=S(n−1)+ΔA2) (Step S10). Thus, also in the case where the shift drum angle S is at the first sensor switching angle R1 and the second sensor switching angle R2, the shift drum angle S(n) is detected holding high precision, with minimum influence on actuator control.

Since the first sensor switching angle R1 and the second sensor switching angle R2 are set to be different from each other in the shift drum angle S, at any shift drum angle, the first angle sensor 84 and the second angle sensor 94 are prevented from simultaneously detecting their respective first sensor switching angle R1 and second sensor switching angle R2. Thus, the rotational angle of the shift drum 80 is detected always according to the output value of at least one of the first angle sensor 84 and the second angle sensor 94 thereby minimizing any influence on actuator control.

As in the present embodiment, also in the case where: the lead grooves 81 of the shift drum 80 are arranged to cover a round of 360 degrees from the reverse position P(RVS) on the shift-down end to the shift-up side and additionally the seventh speed position P(7-n) on the shift-up end past 360 degrees; and the shift drum 80 rotates past 360 degrees, setting the first sensor switching angle R1 and the second sensor switching angle R2 to the shift drum angles S different from each other will attain precise and constant detection of the shift drum angle S from 0 degrees to 384 degrees.

The reverse position P(RVS) which is the lowermost-position shift stage on the shift-down end and the seventh speed position P(7-n) which is the uppermost-position shift stage on the shift-up end are at an identical rotational angle position as the shift drum 80. Therefore, in the case where previous value S(n−1) of the shift drum angle S is lost at start-up, whether the reverse position P(RVS) or the seventh speed position P(7-n) is set cannot be determined from the sensor output values Vout1, Vout2 of the first angle sensor 84 and the second angle sensor 94. That is, a precise shift drum angle S cannot be detected.

Figure 15:
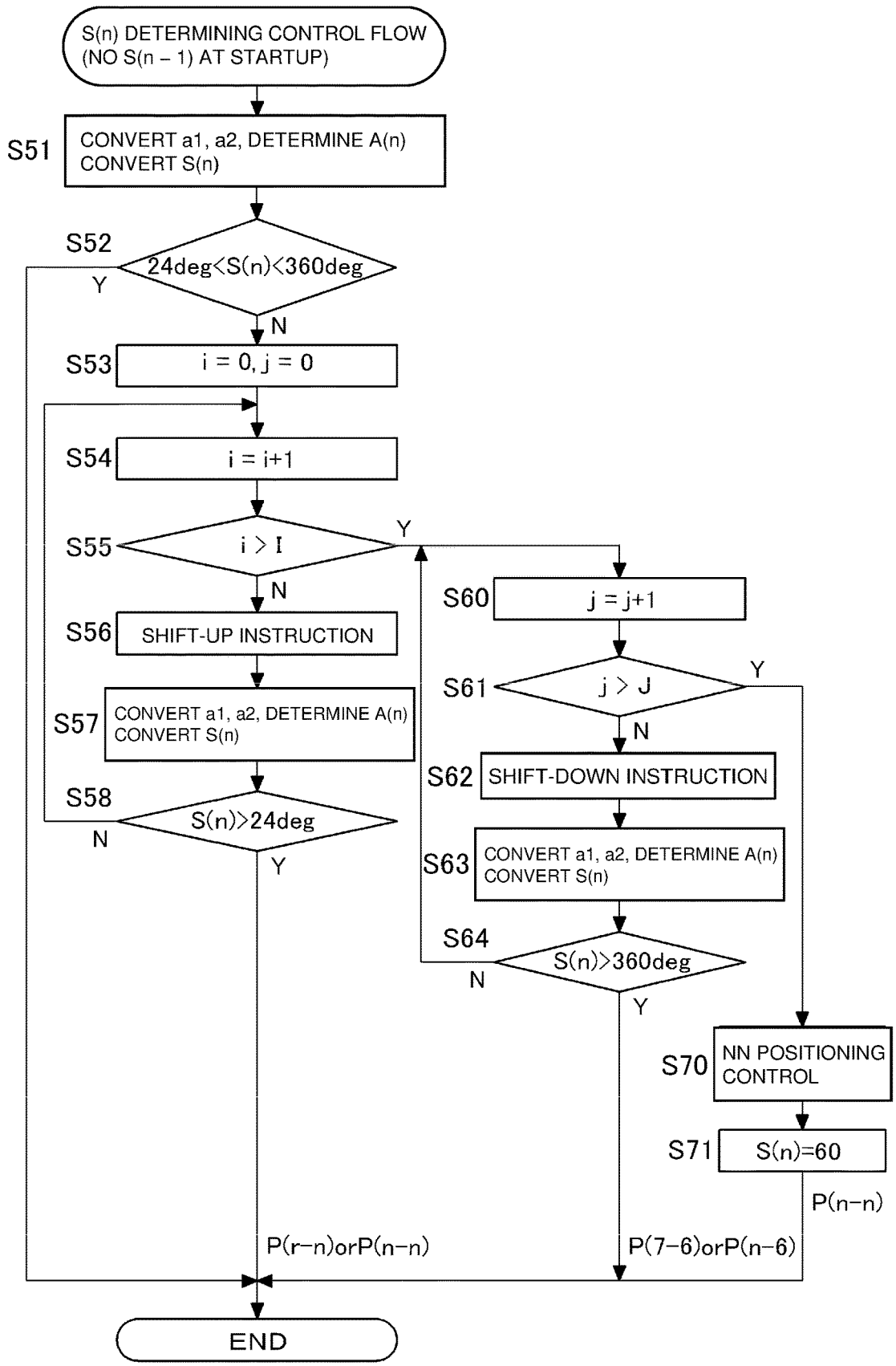
FIG. 15 is a flowchart of determining the shift drum angle where the previous value of the shift drum angle does not exist.

In such a case, the shift drum angle detecting device 100 detects the shift drum angle S by control according to the flowchart of FIG. 15.

The shift drum angle S(n) determining control flow in FIG. 15 is executed at start-up when the previous value S(n−1) of the shift drum angle S is lost at start-up.

In Step S51 of the flowchart of FIG. 15, processes identical to the processes executed in Steps S1, S2, S3, S4 in the shift drum angle S(n) determining flow in FIG. 12 are executed.

That is, the first sensor output value Vout1 is converted to the shaft rotational angle a1 of the first sensor shaft 83; the second sensor output value Vout2 is converted to the shaft rotational angle a2 of the second sensor shaft 92; the first sensor angle A1(n) and the second sensor angle A2(n) are respectively obtained from the shaft rotational angles a1, a2; the sensor angle A(n) is determined from the first sensor angle A1(n) and the second sensor angle A2(n); and the sensor angle A(n) is converted to the shift drum angle S(n), to derive the shift drum angle S(n).

Next, in Step S52, whether or not the detected shift drum angle S(n) is between 24 degrees and 360 degrees is determined. When the shift drum angle S(n) is between 24 degrees and 360 degrees, the shift drum angle S(n) detected in Step S51 is adaptable as it is, and control exits the flow.

When the shift drum angle S(n) is not between 24 degrees and 360 degrees and if S(n)≤24 degrees is established, the gear position may not be at the reverse position P(RVS) and may be at the seventh speed position P(7-n). If S(n)≥360 degrees is established, the gear position may not be at the seventh speed position P(7-n) and may be at the reverse position P(RVS). Thus, the determination cannot be made, and control proceeds from Step S52 to Step S53.

In Step S53, a count value i and a count value j are set to "0". In Step S54, the count value i is incremented. In Step S55, whether or not the count value i exceeds a predetermined count value I is determined. Until the count value i exceeds the predetermined count value I, control proceeds to Step S56, where a shift-up instruction of driving the shift drum 80 toward the shift-up side is issued.

Next, in Step S57, a process identical to that in the previous Step S51 is executed, to derive the shift drum angle S(n) from the first sensor output value Vout1 and the second sensor output value Vout2.

Next, in Step S58, whether or not the derived shift drum angle S(n) exceeds 24 degrees is determined. When the shift drum angle S(n) does not exceed 24 degrees, control returns to Step S54, and Step S54 to Step S58 are repeatedly executed. Before the count value i incremented for each repetition of Step S54 to Step S58 exceeds the predetermined count value I, when the shift drum angle S(n) derived in Step S57 does not exceed 24 degrees despite repeatedly issued shift-up instructions in Step S56, the shift stage may be at the seventh speed position P(7-n) which is the uppermost-position shift stage on the shift-up end. In this case, control jumps from Step S55 to Step S60.

When the shift drum angle S(n) derived in the Step S57 exceeds 24 degrees before the count value i exceeds the predetermined count value I as a result of Step S54 to Step S58 being repeatedly executed, the shift stage is at the reverse position P(RVS) which is the lowermost-position shift stage on the shift-down end; which means that the shift drum angle S(n) exceeds 24 degrees because of the shift drum 80's actually rotating in the shift-up direction in response to the shift-up instruction in Step S56. Thus, the shift drum 80 has rotated to reach the finally-derived shift drum angle S(n) exceeding 24 degrees.

The gear position is at the first neutral position P(r-n) or the second neutral position P(n-n).

When the shift drum angle S(n) derived in Step S57 does not exceed 24 degrees before the count value i exceeds the predetermined count value I as a result of Step S54 to Step S58 being repeatedly executed, the shift stage may be at the seventh speed position P(7-n) which is the uppermost-position shift stage. When control jumps from Step S55 to Step S60, whether or not a count value j exceeds a predetermined count value J is determined. Until the count value j exceeds the predetermined count value J, control proceeds to Step S62, where a shift-down instruction of driving the shift drum 80 toward the shift-down side is issued.

Next, in Step S63, a process identical to that in the previous Step SM is executed, to derive the shift drum angle S(n) from the first sensor output value Vout1 and the second sensor output value Vout2.

Next, in Step S64, whether or not the derived shift drum angle S(n) is less than 360 degrees is determined. When the derived shift drum angle S(n) is not less than 360 degrees, control returns to Step S60, and Step S60 to Step S64 are repeatedly executed.

Before the count value j incremented for each repetition of Step S60 to Step S64 exceeds the predetermined count value J, when the shift drum angle S(n) derived in Step S63 does not become less than 360 degrees despite repeatedly issued shift-down instructions in Step S62, the shift stage may not be at the seventh speed position P(7-n) which is the uppermost-position shift stage on the shift-up end. In this case, control jumps from Step S61 to Step S70.

When the shift drum angle S(n) derived in Step S63 becomes less than 360 degrees before the count value j exceeds the predetermined count value J as a result of Step S60 to Step S64 being repeatedly executed, the shift stage is at the seventh speed position P(7-n) which is the uppermost-position shift stage on the shift-up end; which means that the shift drum angle S(n) is less than 360 degrees because of the shift drum 80's actually rotating in the shift-down direction in response to the shift-down instruction in Step S62. Thus, the shift drum 80 has rotated to reach the finally-derived shift drum angle S(n) of less than 360 degrees.

The gear position is at the sixth speed-seventh speed preparatory position P(7-6) or the sixth speed position P(n-6).

When the shift drum angle S(n) derived in Step S63 does not become less than 360 degrees before the count value j exceeds the predetermined count value J as a result of being repeatedly executed Step S60 to Step S64, the shift stage is not at the seventh speed position P(7-n) which is the uppermost-position shift stage, and the shift drum angle S(n) is not determined.

In this case, control jumps from Step S61 to Step S70, to execute an NN positioning control of forcibly rotating the shift drum 80 to the second neutral position P(n-n). Next, in Step S71, the shift drum angle S(n) is set to 60 degrees.

The gear position is at the second neutral position P(n-n).

In the case where, in the lead grooves 81 formed at the outer circumferential surface of the shift drum 80, when the lowermost-position shift stage on the shift-down end and the uppermost-position shift stage on the shift-up end are at an identical rotational angle position while axially displaced from each other, by any factor, whether the shift stage is the lowermost-position shift stage or the uppermost-position may not be determined. In such a case, as has been described above, whether the shift stage is the lowermost-position shift stage or the uppermost-position shift stage can be determined by rotating the shift drum 80 in one direction and determining whether or not the switching of the shift stage is executed. Thus, the shift drum angle S(n) detected after the execution of the switching the shift stage is adaptable.

The foregoing is the description of the shift drum angle detecting device for a transmission according to one embodiment of the present invention. The modes of the present invention are not limited to the embodiment, and practiced in various modes within the gist of the present invention.

For example, in the present embodiment, while the transmission 31 includes the synchronous mechanism S, the present invention is applicable also to a transmission not including a synchronous mechanism.

REFERENCE SIGNS LIST

Vout1 first sensor output value
Vout2 second sensor output value
A1(n) first sensor angle
A2(n) second sensor angle
A(n) sensor angle
Ano index number
S(n) shift drum angle
P power unit
S synchronous mechanism
br blocking ring
C driven gear
M driving gear
GP gear position
SG shifter gear
Ra speed increasing ratio
11 engine block
11L left engine block half
11R right engine block half
12L left cylinder block
12R right cylinder block
13L left crankcase half
13R right crankcase half
14 cylinder heads
15 head covers
16 crankshaft
17 transmission chamber
18 reduction gear chamber
19 drive shaft
21 front cover
22 transmission holder
23 change system holder
24 reduction gear cover
25 rear cover
26 clutch cover
30 shift driving device
31 transmission
32 main shaft
34 counter shaft
36 gear speed change mechanism
37 chain for reverse
40 hydraulic clutch
40A first hydraulic clutch
40B second hydraulic clutch
41a first clutch inner
41b second clutch inner
42 clutch outer
43 buffer member
46 hydraulic circuit 51 shift motor
53 reduction gear mechanism
54 first intermediate shaft
55 second intermediate shaft
60 change mechanism
61 shift spindle
63 master arm
64 stopper pin
65 torsion coil spring
66 pawl ratchet mechanism
67 ratchet input member
68 ratchet output member
69 pole
70 guide plate
71 shift fork
72 shift fork shaft
80 shift drum
81 lead grooves
82 ball bearings
83 first sensor shaft
84 first angle sensor
85 star-shaped cam
86 recessed part
86c bottom position
87 projecting part
87t vertex
88 detent mechanism
89a detent arm
89c shaft
89r roller
89s torsion coil spring
90 speed increasing mechanism
91 speed increasing driving gear
92 second sensor shaft
93 speed increasing driven gear
94 second angle sensor
100 shift drum angle detecting device

What is claimed is:

1. A shift drum angle detecting device for a constant-mesh transmission including a main shaft holding a plurality of driving gears and a counter shaft holding a plurality of driven gears meshing with the plurality of driving gears, the shift drum angle detecting device comprising:
   shift forks configured to engage with shifter gears of the driving gears and the driven gears;
   a shift drum including an outer circumferential surface provided with lead grooves where one ends of the shift forks engage;
   a first sensor shaft provided at the shift drum so as to integrally rotate with the shift drum;
   a second sensor shaft configured to rotate at an increased speed as a result of a speed increasing mechanism increasing a rotation of the first sensor shaft by a predetermined speed increasing ratio;
   a first angle sensor configured to output a first sensor output value corresponding to a shaft rotational angle of the first sensor shaft; and
   a second angle sensor configured to output a second sensor output value corresponding to a shaft rotational angle corresponding to the second sensor shaft, wherein
   the first sensor output value once switches between a maximum value and a minimum value at a first sensor switching angle per rotation of the shift drum,
   the second sensor output value switches between a maximum value and a minimum value at a second sensor switching angle for a number of times corresponding to the speed increasing ratio of the speed increasing mechanism per rotation of the shift drum,
   a rotational angle of the shift drum is detected using the first sensor output value and the second sensor output value input at predetermined timing, and
   the first sensor switching angle and the second sensor switching angle are set to be different from each other in rotational angle of the shift drum.

2. The shift drum angle detecting device for a transmission according to claim 1, wherein
   when it is determined that the first angle sensor is detecting the first sensor switching angle, the rotational angle of the shift drum is detected according to a previous value of the detected rotational angle of the shift drum and a change amount of a second sensor angle obtained by converting the detected shaft rotational angle of the second angle sensor to a rotational angle of the shift drum, and
   when it is determined that the second angle sensor is detecting the second sensor switching angle, the rotational angle of the shift drum is detected according to the previous value of the detected rotational angle of the shift drum and a change amount of a first sensor angle obtained by converting the detected shaft rotational angle of the first angle sensor to a rotational angle of the shift drum.

3. The shift drum angle detecting device for a transmission according to claim 1, wherein the first sensor switching angle and the second sensor switching angle are both set within a rotational angle region including just a neutral position of the shift drum.

4. The shift drum angle detecting device for a transmission according to claim 3, wherein
   the shift drum is provided with a star-shaped cam configured to integrally rotate with the shift drum,
   the star-shaped cam includes an outer circumferential surface where curved recessed parts respectively corresponding to the shift stages and sharpened projecting parts are alternately and continuously arranged in a circumferential direction,
   the shift drum angle detecting device further comprises a detent mechanism including a roller and a biasing means, wherein the roller biased by the biasing means is pressed against the outer circumferential surface of the star-shaped cam and fits into the recessed part corresponding to a prescribed one of the shift stages of the star-shaped cam, to regulate the rotation of the shift drum and establish the prescribed shift stage, and
   the first sensor switching angle is set between a rotational angle of a bottom position at a center of the recessed part at the neutral position of the star-shaped cam and a rotational angle of a vertex of one of the projecting parts positioned on both sides of the recessed part continuously, the first sensor switching angle being set toward the one projecting part.

5. The shift drum angle detecting device for a transmission according to claim 4, wherein
   the roller is rotatably held on an end of a detent arm configured to swing as being biased by the biasing means, and
   in a state where the roller fits into the recessed part at the neutral position of the star-shaped cam, the first sensor switching angle is set to a rotational angle toward, out of the projecting parts positioned on both sides of the recessed part continuously, the projecting part on a farther side from a swing center of the detent arm.

6. The shift drum angle detecting device for a transmission according to claim 1, wherein
in the shift drum, in the lead grooves formed at the outer circumferential surface, a lowermost-position shift stage on a shift-down end and an uppermost-position shift stage on a shift-up end are at an identical rotational angle position while axially displaced from each other, and
at start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

7. The shift drum angle detecting device for a transmission according to claim 2, wherein the first sensor switching angle and the second sensor switching angle are both set within a rotational angle region including just a neutral position of the shift drum.

8. The shift drum angle detecting device for a transmission according to claim 2, wherein
in the shift drum, in the lead grooves formed at the outer circumferential surface, a lowermost-position shift stage on a shift-down end and an uppermost-position shift stage on a shift-up end are at an identical rotational angle position while axially displaced from each other, and
at start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

9. The shift drum angle detecting device for a transmission according to claim 3, wherein
in the shift drum, in the lead grooves formed at the outer circumferential surface, a lowermost-position shift stage on a shift-down end and an uppermost-position shift stage on a shift-up end are at an identical rotational angle position while axially displaced from each other, and
at start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

10. The shift drum angle detecting device for a transmission according to claim 4, wherein
in the shift drum, in the lead grooves formed at the outer circumferential surface, a lowermost-position shift stage on a shift-down end and an uppermost-position shift stage on a shift-up end are at an identical rotational angle position while axially displaced from each other, and
at start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

11. The shift drum angle detecting device for a transmission according to claim 5, wherein
in the shift drum, in the lead grooves formed at the outer circumferential surface, a lowermost-position shift stage on a shift-down end and an uppermost-position shift stage on a shift-up end are at an identical rotational angle position while axially displaced from each other, and
at start-up, when the shift drum is at a rotational position of the lowermost-position shift stage or the uppermost-position shift stage, whether the shift stage is the lowermost-position shift stage or the uppermost-position shift stage is determined by rotating the shift drum in one direction and determining whether or not switching of the shift stage is executed.

* * * * *